US012792598B2

(12) United States Patent
Bouyarmane

(10) Patent No.: US 12,792,598 B2

(45) **Date of Patent: *Nov. 10, 2026**

(54) ARTIFICIAL INTELLIGENCE SYSTEM FOR TRANSLATION-LESS SIMILARITY ANALYSIS IN MULTI-LANGUAGE CONTEXTS

(71) Applicant: Amazon Technologies, Inc., Seattle, WA (US)

(72) Inventor: Karim Bouyarmane, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 18 days.

This patent is subject to a terminal disclaimer.

(21) Appl. No.: 18/471,240

(22) Filed: Sep. 20, 2023

(65) Prior Publication Data

US 2024/0012809 A1 Jan. 11, 2024

Related U.S. Application Data

(63) Continuation of application No. 16/902,055, filed on Jun. 15, 2020, now Pat. No. 11,797,530.

(51) Int. Cl.

| | |
|---|---|
| ***G06F 16/242*** | (2019.01) |
| ***G06F 16/2457*** | (2019.01) |
| ***G06F 16/28*** | (2019.01) |
| ***G06F 18/214*** | (2023.01) |
| ***G06F 40/20*** | (2020.01) |
| ***G06N 3/08*** | (2023.01) |

(52) U.S. Cl.

CPC ...... *G06F 16/243* (2019.01); *G06F 16/24575* (2019.01); *G06F 16/288* (2019.01); *G06F 18/2155* (2023.01); *G06F 40/20* (2020.01); *G06N 3/08* (2013.01)

(58) Field of Classification Search

CPC ............ G06F 16/243; G06F 16/24575; G06F 16/288; G06F 40/20; G06F 18/2155; G06N 3/08

See application file for complete search history.

(56) References Cited

U.S. PATENT DOCUMENTS

| | | | | |
|---|---|---|---|---|
| 8,744,840 | B1 | 6/2014 | Morrison | |
| 8,756,249 | B1 * | 6/2014 | Wallace | G06F 16/148 707/688 |
| 10,417,350 | B1 * | 9/2019 | Mohamed | G06N 20/00 |
| 2005/0060643 | A1 | 3/2005 | Glass et al. | |

(Continued)

OTHER PUBLICATIONS

Yuting Song et al, "Metadata Similarity Calculation in Cross-Language Record Linkage based on Cross-Lingual Embedding Models", dated 2019, pp. 1-7.

(Continued)

*Primary Examiner* — Jensen Hu

(74) *Attorney, Agent, or Firm* — Robert C. Kowert; Kowert, Hood, Munyon, Rankin & Goetzel, P.C.

(57) ABSTRACT

A hierarchical embedding model is used to obtain respective language-agnostic embeddings of entity records of a cross-language data set. A plurality of record representation pairs is prepared based at least in part on the language-agnostic embeddings. A machine learning model is trained using the record representations pairs to generate similarity scores for pairs of entity records whose text attributes are expressed in different languages.

20 Claims, 13 Drawing Sheets

(56) References Cited

U.S. PATENT DOCUMENTS

| | | | | |
|---|---|---|---|---|
| 2013/0289988 A1* | 10/2013 | Fry | G10L 15/19 704/239 |
| 2015/0057992 A1 | 2/2015 | Danielyan et al. | |
| 2016/0350288 A1 | 12/2016 | Wick et al. | |
| 2017/0091320 A1 | 3/2017 | Psota et al. | |
| 2018/0203849 A1* | 7/2018 | Geib | G06F 40/30 |
| 2019/0197119 A1* | 6/2019 | Zhang | G06F 16/35 |
| 2020/0104359 A1* | 4/2020 | Patel | G06N 3/045 |
| 2020/0210523 A1* | 7/2020 | Aghajanyan | G06N 3/044 |
| 2020/0311345 A1* | 10/2020 | Patel | G06N 3/094 |
| 2021/0182328 A1* | 6/2021 | Rollings | G06F 40/30 |
| 2021/0303638 A1* | 9/2021 | Zhong | G06F 40/169 |

OTHER PUBLICATIONS

William W. Cohen et al, "A Comparison of String Metrics for Matching Names and Records", dated 2003, pp. 1-6.

Yichao Lu et al, "A neural interlingua for multilingual machine translation", dated Oct. 16, 2018, pp. 1-9.

Ivan P. Fellegi et al, "A Theory for Record Linkage", dated Dec. 1969, vol. 64, No. 328, pp. 1183-1210.

Xiaonan Zhao et al, "A weakly supervised adaptive triplet loss for deep metric learning", pp. 1-4.

Ashish Vaswani et al, "Attention Is All You Need", dated 2017, 31st Conference on Neural Information Processing Systems, pp. 1-11.

Yoon Kim, "Character-Aware Neural Language Models", dated 2016, pp. 1-9.

Oyku Ozlem Cakal et al, " CLRL: Feature Engineering for Cross-Language Record Linkage", dated 2019, pp. 1-4.

Yoon Kim "Convolutional Neural Networks for Sentence Classification", dated Sep. 3, 2014, pp. 1-6.

Yuting Song et al, "Cross-Language Record Linkage based on Semantic Matching of Metadata", dated Mar. 2019, DBSJ Journal vol. 17 No.1, pp. 1-8.

Sidharth Mudgal et al, "Deep Learning for Entity Matching: A Design Space Exploration", dated Jun. 10-15, 2018, pp. 1-16.

Ahmed K. Elmagamid et al, "Duplicate Record Detection: A Survey", dated Jan. 2007, IEEE Transactions on knowledge and data engineering, vol. 19, No. 1, pp. 1-16.

Wang Ling et al, "Finding Function in Form: Compositional Character Models for Open Vocabulary Word Representation", dated May 23, 2016, pp. 1-11.

Melvin Johnson et al, "Google's Multilingual Neural Machine Translation System: Enabling Zero-Shot Translation", vol. 5. pp 339-351, dated 2017.

Vincenzo Di Cicco et al, "Interpreting Deep Learning Models for Entity Resolution: An Experience Report Using Lime", dated Jul. 5, 2019, pp. 1-4.

Holger Schwenk et al, "Learning Joint Multilingual Sentence Representations with Neural Machine Translation", dated Aug. 8, 2017, pp. 1-11.

Arijit Biswas et al, "MRNet-Product2Vec: A Multi-Task Recurrent Neural Network for product Embeddings", dated Sep. 21, 2017, pp. 1-5.

Orhan Firat et al, "Multi-Way, Multilingual Neural Machine Translation with a Shared Attention Mechanism", dated Jan. 6, 2016, pp. 1-10.

Adam Paszke et al, "PyTorch: An Imperative Style, High-Performance Deep Learning Library", 33rd Conference on Neural Information processing system, pp. 1-12.

Halbert L. Dunn et al, "Record Linkage", Dated May 10, 1946, pp. 1-5.

Adelene Y.I. Sim et al, "Record2Vec: Unsupervised Representation Learning for Structured Records", pp. 1-6.

Nils Reimers et al, "Sentence-BERT: Sentence Ebeddings using Siamese BERT-Networks", dated Aug. 27, 2019, pp. 1-11.

Hanna Kopcke et al, "Tailoring entity resolution for matching product offers", dated Mar. 26-30, 2012, pp. 1-12.

Sebastian Klenk et al, "The Normalized Compression Distance as a Distance Measure in Entity Identification", dated Apr. 8, 2010, pp. 1-17.

Edourd Grave et al, "Unsupervised Alignment of Embeddings with Wassertein Procrustes", dated May 29, 2018, pp. 1-11.

* cited by examiner

ARTIFICIAL INTELLIGENCE SYSTEM FOR TRANSLATION-LESS SIMILARITY ANALYSIS IN MULTI-LANGUAGE CONTEXTS

PRIORITY APPLICATION

This application is a continuation of U.S. patent application Ser. No. 16/902,055, filed Jun. 15, 2020, which is hereby incorporated by reference herein in its entirety.

BACKGROUND

In recent years, more and more raw data that can potentially be utilized for solving complex analytics problems is being collected from a large variety of sources, such as sensors of various kinds including medical equipment, store catalog entries, web server logs, social media services, financial transaction records, security cameras, and the like. A variety of analytics techniques, including machine learning, statistics, graph theory and the like can be combined to create algorithms that can solve problems in various domains such as natural language processing, financial fraud detection, terrorism threat level detection, human health diagnosis and the like.

Finding solutions to the problem of identifying duplicate entities in a large group of entities, or of identifying closely matching entities from such groups, is important for a variety of applications. For example, databases containing records from multiple sources may sometimes have to be merged, as when two business organizations combine into a single organization. A customer database from one of the organizations may store information about customers in a different format, or using a different schema, than the format or schema used by the other organization, and identifying and removing duplicate entries may be desirable. In another context, identifying duplicate items (or clusters of near-duplicate items) within large item catalogs may be helpful for organizing the catalogs, responding to search queries, and so on.

A number of algorithms have been developed in an attempt to address similarity-based clustering or deduplication of data records. However, the problem of determining similarities between records becomes significantly harder in scenarios in which attributes of the records to be analyzed may be expressed in a variety of languages, as is often the case in large organizations whose operations span multiple countries.

Figure 1:
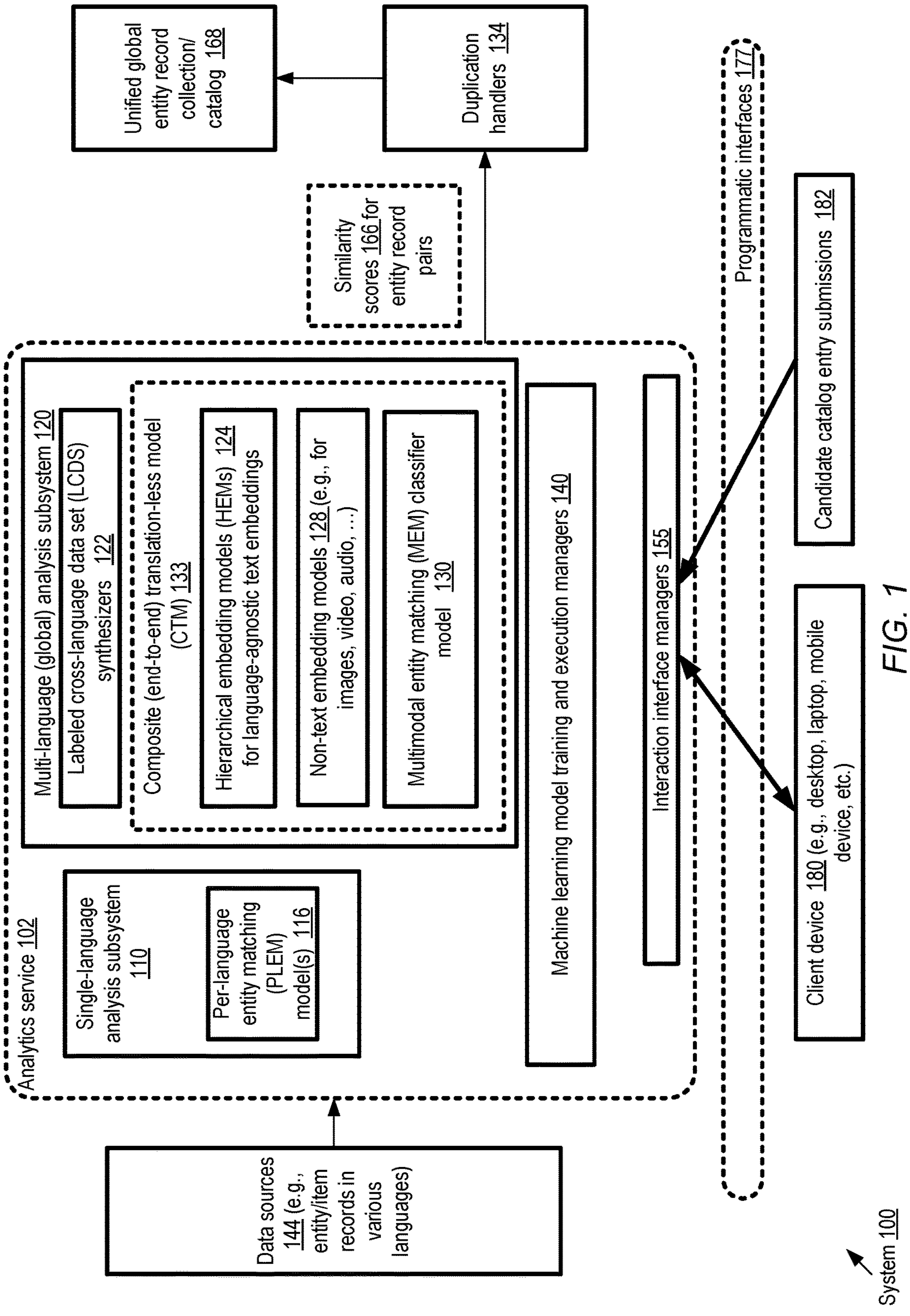
FIG. 1 illustrates an example system environment in which techniques for translation-free similarity analysis of multi-language data may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for translation-less similarity analysis of entity records whose text attributes are expressed in a variety of languages. Generally speaking, an entity record may be intended to be used to represent or capture various characteristics of a real-world object, item or person. For example, in a store context (such as an online store or a brick-and-mortar store), entity records may be used to represent items of a catalog which potential consumers can search or browse before making purchasing decisions. A given entity record may typically include values for various attributes, often including one or more unstructured or free-form text attributes; in some cases, entity records may also contain images or other non-text attributes. Entity records may be produced by a variety of sources—e.g., in the store context, sellers may submit entity records describing the products they wish to sell via the store's web sites. In some cases, several entity records which actually represent the same real-world entity may be created for a variety of reasons—e.g., because multiple sellers described the same item in different ways. The organization at which the entity records are stored and managed may wish to detect such duplicate entity records and take various types of responsive actions (such as merging database records which are used to store details of the entities represented in the duplicated records). Similarity scores for pairs of entity records, used for identifying duplicates and near-duplicates, may be generated using a variety of algorithms, models and methods, which may be collectively referred to as entity matching (EM), entity resolution, duplicate detection, record matching, or record linkage techniques. Similarity scores may also be used to detect other types of problems with respect to collections of entity records, such as scenarios in which entity records which represent distinct entities are erroneously merged into a single entity record.

The difficulty of similarity analysis of entity records can be exacerbated by a number of factors, even in scenarios in which all the text attributes are expressed in the same language. For example, some attribute values may be missing or incomplete, or may contain inconsistencies or errors such as misspellings. Non-text attributes such as images may be of varying or poor quality. Depending on the use case, the text may contain numerous domain-specific terms which may not be present in general-purpose dictionaries typically used for natural language processing applications. Similarity analysis is further complicated in scenarios in which the text used to describe attributes can be expressed in different languages (or even a mix of languages) for different entity records. Such multiple-language analysis may have to be performed, for example, in environments in which the submitters/creators of the entity records are distributed among different countries (or across different regions of a multi-lingual country). Some sellers of an international store organization may submit records in English, others in French, others in Spanish, and so on. Traditional string matching based techniques may not work across languages. Furthermore, even the schemas (e.g., the specific collection of attributes) defined for entity records may vary from one country/region to another, and the degree to which the schemas are enforced may differ from one country/region to another. Many general-purpose machine translation algorithms may often not work very well because of the domain-specific vocabularies being used. State-of-the-art sequence-to-sequence neural machine translation (NMT) systems, which typically include an encoding step followed by a decoding step, may be inefficient because the translations produced by the decoding step may have to be re-encoded into an embedding space before similarity scores can be generated. That is, in such approaches, a redundant pipeline consisting of [encoding→decoding→encoding→matching] steps may have to be implemented.

In order to overcome the challenges of entity record similarity analysis in multi-language environments, a translation-free technique may be implemented in at least some embodiments. An end-to-end language-agnostic machine learning model, comprising a number of sub-models, may be trained using synthesized labeled cross-language data sets (LCDSs). The data sets may be synthesized using techniques which take advantage of the following facts: (a) in some countries or contexts (e.g., multi-lingual countries such as Canada or Switzerland), entities may often be described in several different languages by the submitters or creators of the entity records and (b) similarity indicators or labels, derived from single-language analysis, may already be available (or easily obtained) for pairs of such multi-language entity records. Because of the automated synthesis of the training data, the collection of large numbers of manually-labeled training records may be avoided. According to the proposed technique, a composite or end-to-end model may comprise a number of jointly trained subcomponents, including a hierarchical embedding model (HEM) and a classifier. The HEM may be used to produce language-agnostic embeddings (LAEs) of the text portions of entity records in a universal representation language or framework, regardless of the specific language used in the entity records' text attributes. The hierarchical model may comprise nested models or encoders (e.g., each comprising various types of neural networks) working at the character-level, the token or word level, and/or the attribute level as well as the entity record level in at least some embodiments. Because information contained in the entity records is encoded starting at the character level, problems such as misspellings of words, placing of words in the wrong attributes (e.g., including the color of an object in the "title" attribute), or even disparities in entity record schemas, may be overcome in the proposed embedding methodology. Unlike in some conventional approaches towards text similarity analysis, many resource-consuming feature engineering steps, such as cleansing/transforming individual attributes to address the presence of out-of-vocabulary terms, may not be required.

Furthermore, to ensure that non-text information about the entity records is also used (when available), a multi-modal representation of entity records may be generated, which combines the language-agnostic text embeddings as well as non-text encodings/embeddings obtained from image/video/audio or other types of attributes. The multi-modal record representations of pairs of synthesized records of the LCDS may be used as input training data for a classifier machine learning model (e.g., a multi-layer perceptron) which generates respective similarity scores corresponding to any given pair of entity records. The similarity scores or classes generated by the classifier may be used for a variety of applications in different embodiments, including identifying duplicates, unifying language-specific catalogs into a global catalog, and the like. The end-to-end model may be able to generate similarity scores for entity record pairs in a fully language-agnostic manner, e.g., without even requiring information about the which specific languages were used for the text attributes of the entity records, and even in scenarios in which terms in multiple languages are included within a given attribute or entity record.

As one skilled in the art will appreciate in light of this disclosure, certain embodiments may be capable of achieving various advantages, including some or all of the following: (a) enabling high quality similarity analysis of records whose fields or attributes are expressed in multiple languages, without requiring translations of any of the text used in the fields or attributes, (b) detecting submissions of duplicated entity records near-instantaneously, even when the corpus of existing records with respect to which the duplication is detected contains millions of records in a variety of languages, and/or (c) improving the user experience of clients of web sites (including store web sites) which provide end users accesses to large catalogs, e.g., by providing better results for searches and comparisons.

According to some embodiments, a system may comprise one or more computing devices. The computing devices may include instructions that upon execution on or across the one or more computing devices cause the one or more computing devices to obtain a collection of multi-language entity records (MERs). Individual ones of the MERs may comprise a respective plurality of versions of one or more text attributes of an entity, including for example a respective version of a particular text attribute in a first language and a second language. Some of the multi-language entity records comprise a non-text attribute (e.g., an image, a video, or an audio recording) in at least one embodiment. Respective similarity indicators (e.g., similarity scores on a scale between 0 and 1 where 0 indicates complete dissimilarity and 1 indicates perfect similarity, or labels such as "MATCH" and "NO-MATCH") may be obtained for a plurality of MER pairs from existing trained single-language entity matching models or via manual annotation. The instructions when executed on the computing devices may also be used to synthesize, from the MERs, a labeled cross-language data set (LCDS) comprising a plurality of cross-language pairs of entity records in various embodiments. An individual cross-language pair may comprise (a) a first entity record with first language versions of one or more text attributes, (b) a second entity record with second language versions of one or more text attributes and (c) a label based at least in part on a similarity indicator of the respective similarity indicators.

A composite translation-less machine learning model (CTM) comprising several jointly trained sub-models may be trained to generate respective similarity scores for a pair of entity records whose text attributes are expressed in different languages. The training of the composite model may comprise determining respective language-agnostic embeddings (LAEs) of the entity records of the LCDS in various embodiments using a hierarchical embedding model (HEM), one of the jointly trained sub-models. In at least some embodiments, the HEM may comprise a respective nested layer for producing embeddings of (a) individual characters (or other sub-word or sub-tokens) of text attributes of the entity records, (b) individual text tokens comprising one or more of the characters/sub-tokens, (c) individual text attributes, and/or (d) individual ones of the entity records. The terms "sub-word" and "sub-token" may be used to describe units of text that are smaller than words or tokens, and may include one or more individual characters. Some embedding models for sub-words may encode successive pairs of characters taken together, others may encode three characters taken together, while others may encode single characters, and so on. Without requiring a translation of any text, a plurality of labeled multi-modal record representation (MRR) pairs may be prepared from the LAEs and provided as input to a classifier sub-model of the CTM. The first MRR of a given MRR pair may be based at least in part on (a) an LAE of a first entity record of the LCDS and (b) an encoding of a non-text attribute of the first entity record, while the second MRR of the pair may be based at least in part on (a) an LAE of a second entity record of the LCDS and (b) an encoding of the non-text attribute of the second entity record. Using the MRR pairs, the classifier may be trained in various embodiments to produce respective similarity scores for pairs of entity records whose text attributes may be expressed in different languages. The trained version of the composite model may be stored and used to transmit similarity scores via programmatic interfaces for any of a variety of applications, including for example analyzing a multi-language collection of entity records for duplicates, erroneously-merged records or the like. In some embodiments, several different versions of the composite model may be trained, e.g., with different combinations of sub-component implementations. One such version may, for example, combine different types of neural network architectures for the different HEM layers, while another may use the same type of neural network architecture for all the HEM layers. Note that the composite model is trained, it may also be used to generate similarity scores for same-language entity pairs in at least some embodiments.

In some embodiments, non-text attributes may not be used; instead, the composite model may rely entirely on text embeddings. In other embodiments, the MRRs may be generated using encodings of multiple non-text attributes in addition to text attributes. In at least some embodiments, pairwise interaction features may be generated (e.g., using arithmetic operations such as addition, subtraction, or multiplication) from the elements of the respective LAE vectors of a pair of entity records, and the pairwise interaction features may be used as the input to the classifier.

Any of wide variety of machine learning algorithms may be used for different stages or components of the overall end-to-end modeling methodology introduced above in different embodiments. For example, in some embodiments, the HEM may comprise one or more neural network-based models at individual layers of the hierarchy, such as bidirectional long short-term memory units (BiLSTMs), sequence convolutional neural networks (CNNs), and/or transformers. In some embodiments, the same type of neural network architecture may be used for each layer of the hierarchy (e.g., BiLSTMs for character/sub-token embedding, BiLSTMs for token embedding, BiLSTMs for attribute embedding, etc.), while in other embodiments a combination of different model types may be used (e.g., a BiLSTM for character/sub-token embedding, a CNN for token embedding, a transformer for attribute embedding, etc.). The final similarity scores for pairs of entities may also be generated using a variety of classification models in different embodiments, such as multi-layer perceptron neural networks and the like.

In at least some embodiments, a multi-language character collection or vocabulary may be defined and used in the embedding procedure. In one such embodiment, the respective frequencies of occurrence of different characters (e.g., including Unicode characters in one or more scripts/languages/writing systems) within a group of multi-language entity records or other relevant corpora may be determined. The N (e.g., 100 or 200) most-frequently used characters among the corpora may be selected as members of a to-be-encoded collection of characters. If any other characters, which do not belong to the to-be-encoded collection, are found in an entity record for which a LAE is to be generated, the other characters may be replaced by an OOV (out-of-vocabulary) symbol before the LAE is generated. In some embodiments in which the lowest level of embedding is implemented at the sub-word level (with sub-words comprising more than one character), an analogous multi-language sub-word collection (e.g., comprising pairs or triples of frequently-used characters) may be defined and used in the embedding procedure. No other pre-processing may be required for the raw entity records analyzed using the end-to-end model in at least some embodiments. In various embodiments, adding support for additional languages for which translation-less analysis is be performed may involve re-training the composite model with a data set that includes examples of entity records in the additional languages and (depending on the language) expanding the supported list of characters or symbols (e.g., logograms or pictographs) for which embeddings are desired. For at least some types of languages, tokens or words may be defined as variable-length sequences of characters for the HEM, while text attributes may be defined as variable-length sequences of tokens. The schema name of an attribute (e.g., size, color, brand, etc.) may be pre-pended to the attribute when generating the embeddings in at least some embodiments. In some implementations, a maximum number of characters permitted per token may be selected and used to construct fixed-length tokens, with trailing characters being discarded if the actual token is longer than the maximum number of characters permitted, and with zeros used to fill in the fixed-length token if the actual token is shorter than the maximum number of characters permitted. Similar truncation and/or zero-filling techniques may be used to obtain fixed-length attributes (in terms of the number of tokens represented per attribute) and/or fixed-length entity records (in terms of the number of attributes represented per attribute) in at least some embodiments.

In much of this document, the novel techniques for language-agnostic analysis of entity records are described using examples from the store context. However, the techniques may be employed in various embodiments with equal success in any problem domain in which multi-language data may be have to be analyzed or compared, and their applicability and benefits are not restricted to any particular domain.

In some embodiments, the translation-less entity record similarity analysis techniques may be implemented at one or an analytics service of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which techniques for translation-free similarity analysis of multi-language data may be implemented, according to at least some embodiments. As shown, system 100 comprises resources and artifacts of an analytics service 102, including a global or multi-language analysis subsystem 120, a single-language analysis subsystem 110, one or more machine learning model training and execution managers 140 and interaction interface managers 155 in the depicted embodiment. The analytics service 102 may implement one or more programmatic interfaces 177, such as web-based consoles, application programming interfaces (APIs), command-line tools, graphical user interfaces and the like, which may be used by various categories of clients to submit requests to, and received responses from, the analytics service 102. For example, some clients of the analytics service may include administrators of entity record collections or catalogs, who may submit programmatic requests from a set of client devices 180 (such as desktops, laptops, mobile computing devices including tablets, smart phones and the like) to train models to be used for analysis of multi-language or single-language entity records. In some embodiments in which new entries to be included in catalogs or entity record collections may be submitted via programmatic interfaces, the submissions 182 may also be sent to the analytics service 102, e.g., to quickly detect whether a proposed submission represents a duplicate of an earlier submission or not. Interaction interface managers 155, implemented at one or more computing devices, may receive programmatic messages/requests from clients, as well as submissions which are to be checked for duplication, and transmit corresponding internal versions of the messages/requests to other components of the analytics service 102. Analytics service 102 may also be referred to as an artificial intelligence system.

Using the programmatic interfaces 177, a client of the analytics service may specify one or more data sources 144 from which entity records pertaining to an application for which multi-language analysis is to be performed at subsystem 120 can be obtained for analysis in the depicted embodiment. A given entity record may comprise values for one or more attributes, including text attributes (e.g., names/titles, descriptions, product identifiers, categories, colors, sizes, relevant dates, packaging quantities, etc. of real-world entities or objects) and/or non-text attributes such as images and the like. In at least some cases, depending for example on legal requirements, best practices, or for business reasons, values of at least some attributes may be provided or expressed in more than one language by the creators/submitters of the entity records. For example, some multi-lingual or bilingual countries, states or regions may require products in a catalog to be described in several different languages, or the set of targeted customers of a given application may be multi-lingual, so the catalog items may be described in multiple languages based on policies of the application owner. Entity records containing at least some attributes expressed in two or more languages may be referred to as multi-language entity records (MERs) in various embodiments. A collection of such MERs may be obtained at the analytics service 102 in the depicted embodiment from data sources 144 for performing multi-language analysis at the subsystem 120. For example, some number of MERs containing text attributes expressed in French as well as English may be obtained, as well as other MERS containing text attributes expressed in Spanish as well as English. In at least one embodiment, a client of the analytics service may use the programmatic interfaces 177 to specify a set of languages (e.g., English, French, Spanish, German, Russian, etc.) to be supported for cross-language analysis of entity records, and a collection of MERs may be selected from a larger corpus based on the set of languages specified by the client.

In addition to the raw MERs themselves, respective similarity indicators such as numeric similarity scores (or labels such as MATCH or NO-MATCH) may also be obtained for at least some pairs of MERs in different embodiments. In some embodiments, one or more per-language entity matching (PLEM) machine learning models 116 of the single-language analysis subsystem 110 may be used to obtain the similarity indicators. For example, a PLEM model trained using pairs of entity records with English text attributes may be able to generate similarity scores for an MER pair (MER1, MER2), using only the English versions of the text attributes of MER1 and MER2, where MER1 also happens to contain French versions of the text attributes, and MER2 also happens to contain Spanish versions of the text attributes. In other embodiments, instead of or in addition to using the PLEM models to obtain the similarity indicators, the similarity indicators may be obtained using human labelers and/or annotators. The human annotators may also need to consider attribute values in a single language to generate their labels/scores in at least some cases: for example, to determine whether MER1 is likely to be a duplicate or match for MER2, an English-speaking labeler may only examine the English language version of the text attributes of the two records, and not the French or Spanish versions in the above examples.

Using the MERs and their similarity indicators, labeled cross-language data set (LCDS) synthesizers 122 (implanted at one or more computing devices) may be able to prepare a data set comprising pairs of entity records ($E_i$, $E_j$) in which $E_i$'s text attributes are expressed in a different language than Ej's. For example, from MER1 and MER1 in the above example, the following cross-language entity record pairs may potentially be generated: (English-MER1, Spanish-MER2), (English-MER2, French-MER1) and (French-MER1, Spanish-MER2). The similarity indicator obtained for the (MER1, MER2) combination may be used to obtain the label for each of the synthesized cross-language entity record pairs.

A composite translation-less model (CTM) 133 comprising a number of subcomponents may be prepared using the LCDS in various embodiments to produce similarity scores for entity record pairs in a language-agnostic fashion. The model may be referred to as translation-less or translation-free because, given an LCDS, no additional text may have be translated from one language to another for the model to work; instead, text in any language (of a set of supported languages) may be transformed into a universal embedding representation or framework, and an estimate of similarity between any given pair of entity records may be computed using the universal embeddings in the model. The model may be referred to as a composite or end-to-end model because its text-analysis related subcomponents may be trained jointly, without requiring one-at-a-time training and evaluation of the subcomponents. From the perspective of users, the composite model may be conceptualized as a single entity to which pairs of entity records in any combination of supported languages can be provided as input with little or no pre-processing required, and from which similarity scores for the pairs of entity records can be obtained as output. Note that in at least some embodiments in which non-text portions (such as images) of the entity records are also used along with text for similarity analysis, pre-trained versions of encoding/embedding models for the non-text portions may be employed. In other embodiments, instead of using pre-trained models, embedding/encoding models for the non-text portions may also be trained jointly with the models used for text analysis.

The subcomponents of the CTM 133 may comprise one or more hierarchical embedding models (HEMs) 124, one or more non-text embedding models 128 and one or more multimodal entity matching (MEM) classifier models in the embodiment depicted in FIG. 1. An HEM 124 may be trained to generate language-agnostic embeddings (LAEs) or encodings for the text portions of the entity records. Within the HEM, respective nested sub-models, each for example comprising a respective deep neural network, may be used to generate embeddings or encodings at the character level, the token or word level, the attribute level and the entity record level in at least some embodiments. Any combination of a variety of machine learning model architectures may be used in different embodiments at the different layers—e.g., some combination of bidirectional LSTMs, sequence CNNs, and/or transformers may be used. The LAEs may in effect transform the text portions of the entity records to a universal embedding representation (UER) framework or language, in which the key characteristics of the entity records are captured without regard to the specific language in which the entity records were expressed. The UER may also be referred to as an "interlingua" in some embodiments. For non-text attributes of the entity records, one or more non-text embedding models 128 may be trained at the analytics service and/or provided by analytics service clients in different embodiments.

Using language-agnostic text embeddings obtained from the HEM(s), and non-text embeddings/encodings obtained from the non-text embedding models 128, input data may be generated for a multi-modal entity matching (MEM) classifier model 130 in various embodiments. The input of the MEM may include a plurality of labeled multi-modal record representation (MRR) pairs in at least some embodiments. The first MRR of a pair may be based at least in part on (a) an LAE of a first entity record of the LCDS and (b) an encoding of one or more non-text attributes of the first entity record, while the second MRR of the pair may be based at least in part on (a) an LAE of a second entity record of the LCDS and (b) an encoding of one or more non-text attributes of the second entity record. The MEM may comprise a multi-layer perceptron in some embodiments, while other types of neural networks, or algorithms which do not require neural networks, may be used for the MEM in different embodiments. The training of various models of the analytics service such as the HEMs 124, the PLEM models 116, and the MEM models 130, may be implemented at machine learning model training and execution managers 140 (which may each comprise or more computing devices) in the depicted embodiment. After the models have been trained, they may be stored and executed as needed in various embodiments. The models may be executed, for example, in response to similarity analysis requests submitted via programmatic interfaces 177, also using the computing devices machine learning model training and execution managers 140. A given similarity analysis request may indicate a pair of entity records expressed not just in different languages, but also in different schemas in some embodiments, for example with some attributes of the first schema of the pair missing entirely from the second schema (and/or vice versa). Despite the differences in both the languages and the schemas, the CTM 133 may nevertheless be able to generate high-quality similarity scores.

For some applications, the similarity scores 166 may be transmitted via programmatic interfaces to one or more duplication handlers 134 configured to initiate response actions when duplication of entity records is detected. Such responses may for example include generating notifications of the duplication, initiating workflows which determine whether and how apparently-duplicated entity records should be merged, and so on. In at least some embodiments, the language-agnostic analysis technique described above may enable large organizations with operations in many countries or regions to merge their single-language entity record collections or catalogs into a unified global collection or catalog 168. Internally, in such embodiments, embeddings expressed in a universal embedding representation (UER) framework, obtained from the HEMs 124, may be used as the authoritative representations of entity records. In various embodiments, the CTM may be used to quickly detect whether a submitted candidate catalog entry (expressed, for example, in a language L1 in a submission 182) is a duplicate of, or very similar to, an existing catalog entry expressed in a different language (or the same language) for which an earlier-generated UER entry is already stored in a repository. If such duplication is detected, a de-duplication action (such as a rejection of the duplicate submission, a merging of the duplicated submissions, and/or a sending of a notification to the submitters involved) may be initiated in at least some embodiments. As such, submitters of proposed catalog entries may be provided near-instantaneous feedback about their submission on the basis of a world-wide analysis, regardless of the language used.

Example Problems Encountered in Multi-Language Scenarios

Figure 2:
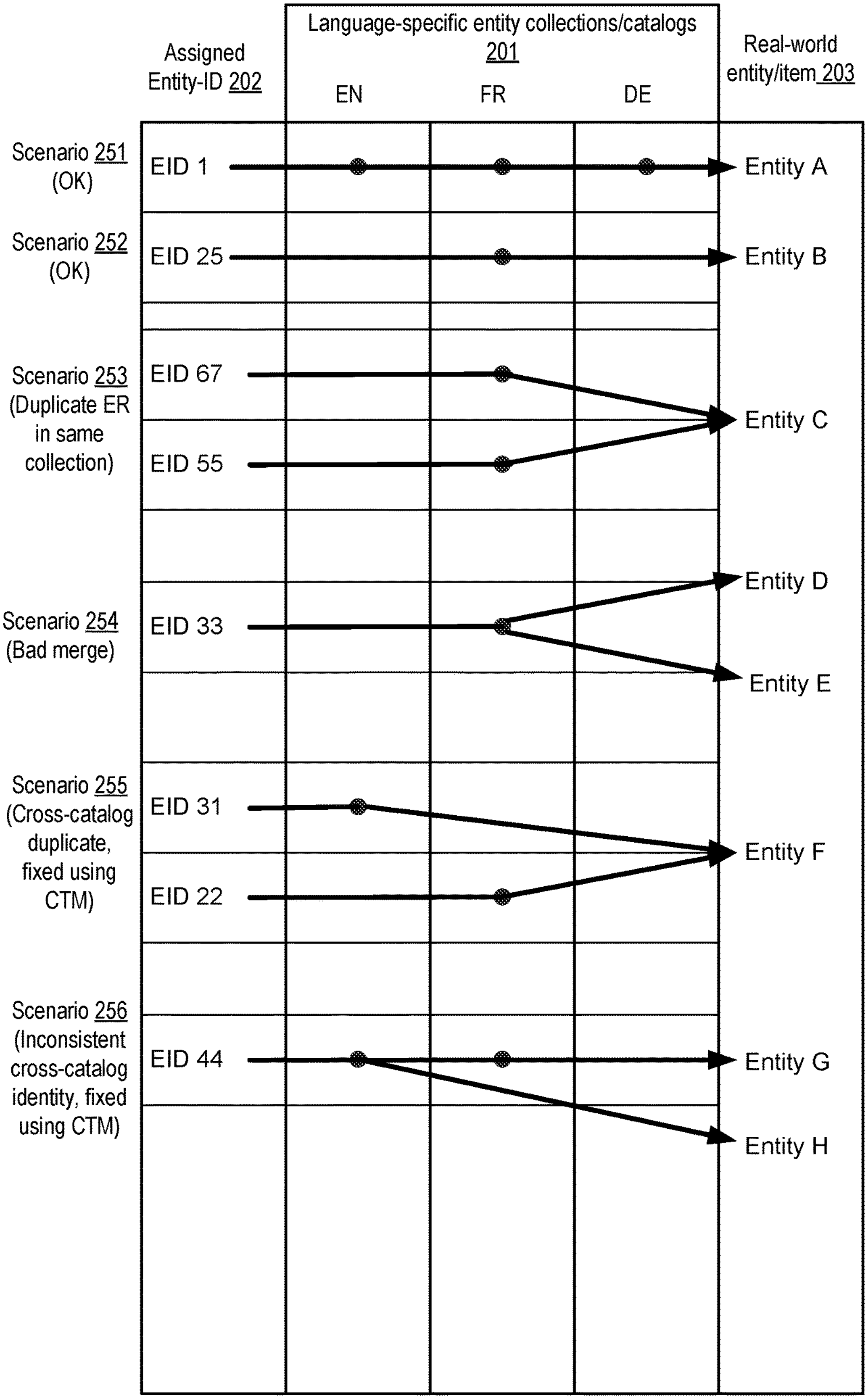
FIG. 2 illustrates example problem scenarios which may be encountered in environments in which language-specific entity record collections are maintained separately, according to at least some embodiments.

FIG. 2 illustrates example problem scenarios which may be encountered in environments in which language-specific entity record collections are maintained separately, according to at least some embodiments. In the depicted scenarios, respective language-specific entity collections or catalogs 201 maintained by an international organization may include one catalog whose primary language is English (referred to by the letters EN), one catalog whose primary language is French (referred to by FR) and German (referred to by DE). Entity records created to represent real-world entities or items 203 may each be assigned an entity identifier (EID) 202, such as EID 1, EID 25, etc.

In some cases, respective versions of entries or entity records for a given real-world entity may be stored in several of the language-specific catalogs 201, and each of them may be identified using the same EID. In scenario 251, for example, the same EID, EID 1 may be used to reference respective entries for real-world Entity A within the EN, FR and DE catalogs, as indicated by the black dots in the columns corresponding to the three catalogs. This scenario is perfectly acceptable (as indicated by the tag “OK” for scenario 251), and does not require any rectification. Some real-world entities such as Entity B may have an entry (with EID 25 in the case of Entity B) in only one language-specific catalog, such as the FR catalog, as in scenario 252, which is also an acceptable scenario.

In scenario 253, two different entries have been created within a single language’s catalog (the FR catalog) for a single real-world entity, Entity C. The two entries or records have been assigned distinct EIDs 67 and 55. This represents a “duplicate in same collection” problem scenario, and such scenarios may normally be detected using a per-language entity matching model (similar to PLEM models discussed in the context of FIG. 1). Language-agnostic models of the kind discussed above are not needed (although they may nevertheless be used successfully) for detecting such single-language duplicate scenarios.

In scenario 254, a single entity record in the FR catalog actually corresponds to two different real-world entities, D and E. This type of problem may happen, for example, if a PLEM model used for French entity records erroneously identifies a pair of FR catalog entries as duplicates, and the two entries of the pair are merged as a result. In the store context, this type of problem may result, for example, different (real-world) items being shipped in response to purchase requests for the same entry in an online catalog. Existing analytics tools, which for example detect variations in the shipping costs, shipping times etc. of different sales associated with the same catalog entry may be able to detect scenarios similar to scenario 254, and language-agnostic tools may not be needed for such detections.

Scenarios 255 and 256 represent examples of problems which can be detected and remediated using the types of language-agnostic techniques introduced above, e.g. using a CTM, and cannot easily or efficiently be addressed using single-language analysis alone. In scenario 255, an entry with EID 31 in the EN catalog and an entry with EID 22 in the FR catalog both happen to refer to the same real-world entity F. This type of scenario may be referred to as a cross-catalog duplicate. In scenario 256, the same EID 44 has been assigned to two entries, one in the EN catalog and one in the FR catalog. However, the entry in the EN catalog actually refers to a real-world entity H, while the entry in the FR catalog refers to a different real-world entity G. This type of scenario may be referred to as inconsistent cross-catalog identity. Both these types of problem scenarios (255 and 256) can be addressed using the types of models discussed in the context of multi-language analysis subsystem 120, because the entity records in different languages may be transformed to a common language-independent embedding, which simplifies similarity/dissimilarity detection regardless of the languages used for the entity records. With the help of the HEM and MEM model of FIG. 1, a high similarity score would be detected for the entity records with EIDs 31 and 32, indicating that they may be duplicates. Similarly, with respect to the entity records to which EID 44 is assigned, the CTM may predict high dissimilarity, which could lead to the creation of a new EID for entity H and the EN entity record which corresponds to entity H. Note that other types of problems may also be detected and remediated using language-agnostic analysis in various embodiments, and the benefits of the language-agnostic techniques introduced above are not limited to scenarios similar to 255 and 256.

Translation-Based Approaches Vs. Translation-Less Approaches

Figure 3:
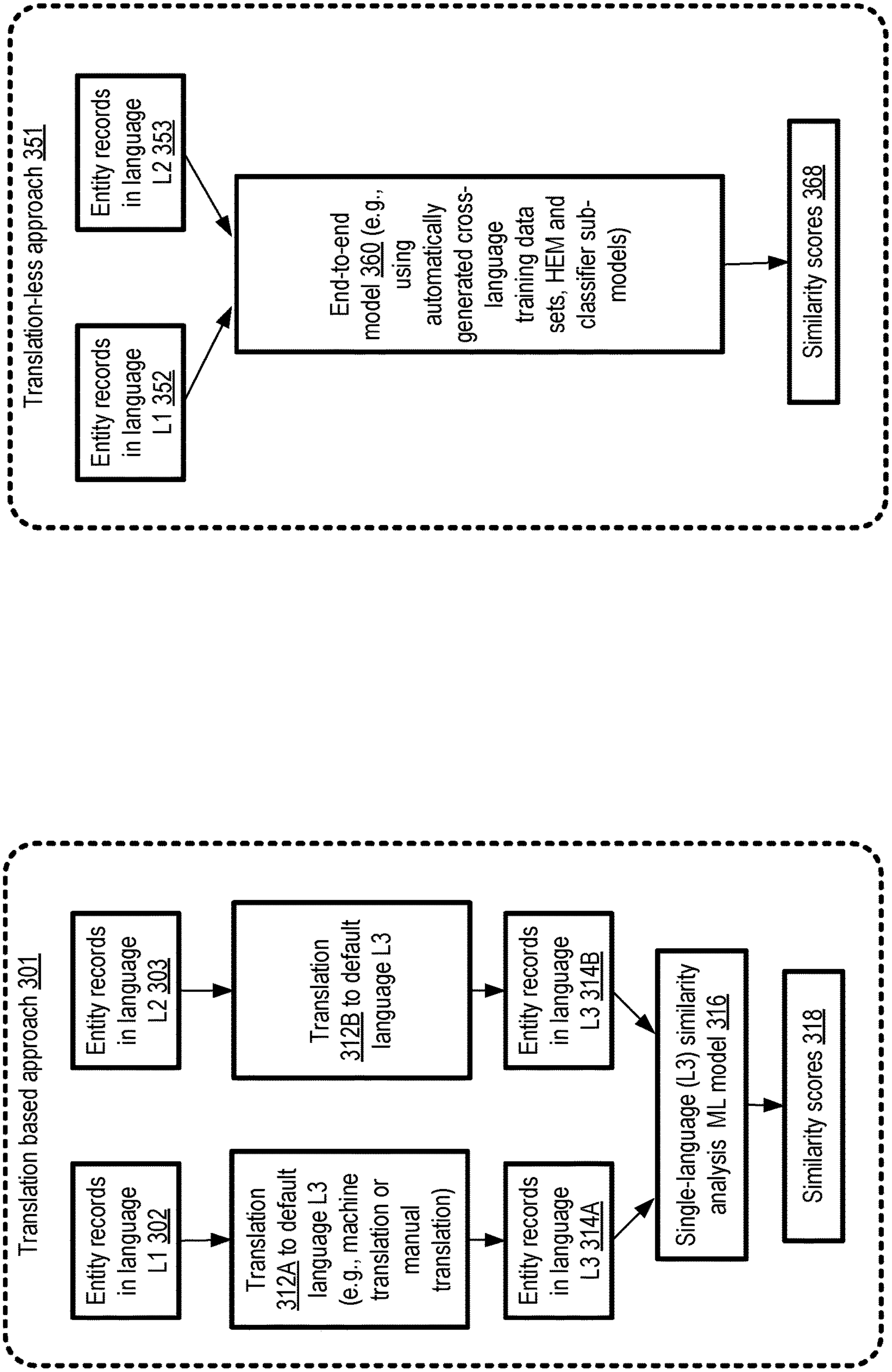
FIG. 3 illustrates a high-level comparison between translation-based approaches and translation-free approaches towards similarity analysis of entity records which may be expressed in different languages, according to at least some embodiments.

When analysis of text in different languages is required, and per-language similarity analysis models of reasonable quality are available, the use of brute-force translation (e.g., to convert all the text into the same language for which a model is available) may represent one possible option. However, for a number of reasons, such translation-based approaches may not be advisable or effective. FIG. 3 illustrates a high-level comparison between translation-based approaches and translation-free approaches towards similarity analysis of entity records which may be expressed in different languages, according to at least some embodiments. In translation based approach 301, respective collections of entity records 302 and 303, in languages L1 and L2, may first be translated to a preferred or default language L3. Translation 312A may be performed to transform the text of entity records 302 to L3, e.g., using machine translation algorithm or using a set of human translators. Similarly, translation 312B may be performed to obtain L3 versions of the L2 records 303. The L3 versions of the records, 314A and 314B, may then be provided as input to a single-language similarity detection model 316, from which similarity scores 318 may then be obtained. Problems associated with the translation based approach 301 may include the following. First, in scenarios in which many different languages other than the default language L3 are to be dealt with, obtaining automated or manual translations from all those languages into L3 may be difficult. Machine translation models may not work very well for domain-specific text vocabulary terms, and the quality of the machine translation may vary depending on the language. Manual translations may require identifying translators of similar levels of quality for all the languages, may take long times for large numbers of entity records, and may also be error-prone as the number of entity records to be translated increases. In some large-scale applications, for examples, translations may be required for tens of thousands or hundreds of thousands of entity records submitted per day.

For these and other reasons, a translation-less approach 351 similar to that introduced above may be preferable. In such an approach, entity records 352 and 353, in any pair of languages of a targeted group of languages, may be provided as input to an end-to-end model 360 (similar in features and functionality to CTM 133 of FIG. 1). Within the end-to-end model, cross-language training data may be automatically generated or synthesized using existing multi-language entity records, a hierarchical embedding model (HEM) may be used to transform the text of the entity records into a unified embedding representation framework, and a classifier which uses both text and non-text attribute encodings to infer similarity scores 368 may be employed in various embodiments.

Synthesis of Cross-Language Data Sets

Figure 4:
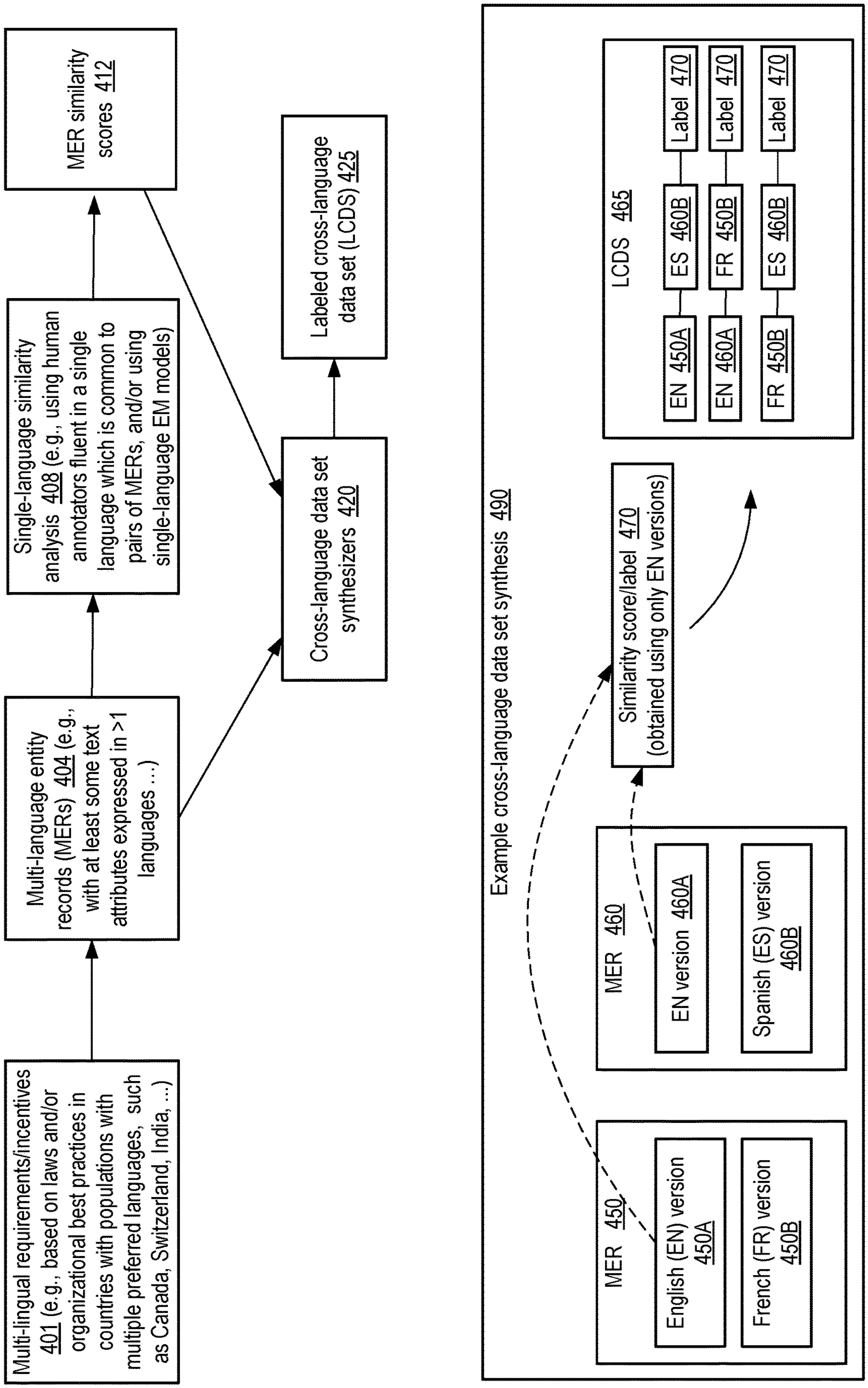
FIG. 4 includes a flow diagram illustrating aspects of operations that may be performed to synthesize labeled cross-language data sets, and an example of such a data set, according to at least some embodiments.

In order to train models to generate similarity scores for entity records in a language-agnostic manner, a data set which contains pairs of records in different languages may be needed in various embodiments. FIG. 4 includes a flow diagram illustrating aspects of operations that may be performed to synthesize labeled cross-language data sets, and an example of such a data set, according to at least some embodiments. In some countries, the population may include people (collectively) speaking several different languages as their preferred or mother tongue. Prominent examples of such countries include Canada, Switzerland, and India, but numerous other countries may also include subsets of populations that are more fluent in one language than another. As a result of such language preferences, a set of multi-lingual requirements may be enforced in some countries, e.g., based on laws passed by the government. Furthermore, even in scenarios in which laws do not explicitly require multiple languages to be used, it may make business sense to do so, so many private and/or public organizations may require items or entities to be described in several different languages. In some cases, providers of the entity records may not necessarily be required to include text attributes in multiple languages, but may have incentives to do so. For example, in a store or shopping context, a seller of a product may be incentivized to provide text attributes for an item or product in multiple languages to try to reach a broader market than would have been reached using a single language.

As a result of such multi-lingual requirements/incentives 401, a set of multi-language entity records (MERs) 404 may be generated, with respective versions of at least some text attributes expressed in each of several languages. For example, a seller wishing to sell a product via a web site may provide descriptions of the product in languages L1 and L2, making it at least somewhat more likely that potential customers who are fluent in L2 will buy the product than if the product were described in L1 alone. Because the MERs 404 contain multiple versions of attributes in respective languages, and some of these languages may be common across pairs of MERs (as illustrated in example 490 of FIG. 4), single-language similarity analysis 408 may be sufficient to generate MER similarity scores 412 for such pairs of MERs. Similarity scores 412 (and/or corresponding non-numeric labels) may be generated by human annotators fluent in a single language, and/or by single-language entity matching (EM) models in different embodiments.

One or more cross-language data set synthesizers, implemented at one or more computing devices, may take the MERs 404 and their associated similarity scores 412 as input, and generate a labeled cross-language data set (LCDS) 425 in the depicted embodiment. The LCDS may comprise pairs of entity records, in which each element of a pair is in a different language. The MER similarity scores which were generated via single-language analysis, may still be applicable to the cross-language pairs; as a result, the labels of the LCDS 425 may be obtained with no additional computations needed.

In example 490 of cross-language data set synthesis, two MERs 450 and 460 are shown. MER 450 comprises an English (EN) version 450A of one or more text attributes, and a French (FR) version 450B of the same attributes. MER 460 comprise an EN version 460A of the attributes, and a Spanish (ES) version 460B of the attributes. Because both MERs include a respective EN version, a similarity score or label for the (MER 450, MER 460) pair of entity records may be obtained without requiring cross-language or language-agnostic techniques. Note that at least in some embodiments, it may be the case that somewhat different schemas are used for the MERs 450 and 460—some attributes present in one or both language versions of MER 450 may not even be present in one or both language versions of MER 460.

Using the similarity score 470, and the combinations of different languages in which the attributes are available, an LCDS 465 may be generated, comprising at least three pairs of entity records in the depicted example 490. One cross-language pair includes EN version 450A and ES version 460B, another includes EN version 460A and FR version 450B, while the third includes the FR version 450B and the ES version 460B. All three may be assigned the same similarity score or label 470. In embodiments in which more than two versions of the same set of text attributes are provided in different languages by the submitters of the MERs, entity records in a large number of combinations of language pairs may be easily generated and used to train the language agnostic models. For example, it may be the case that versions in English, French, Italian, German and Spanish may all be provided for text attributes of some catalogs.

Levels of Language Agnosticism

Figure 5:
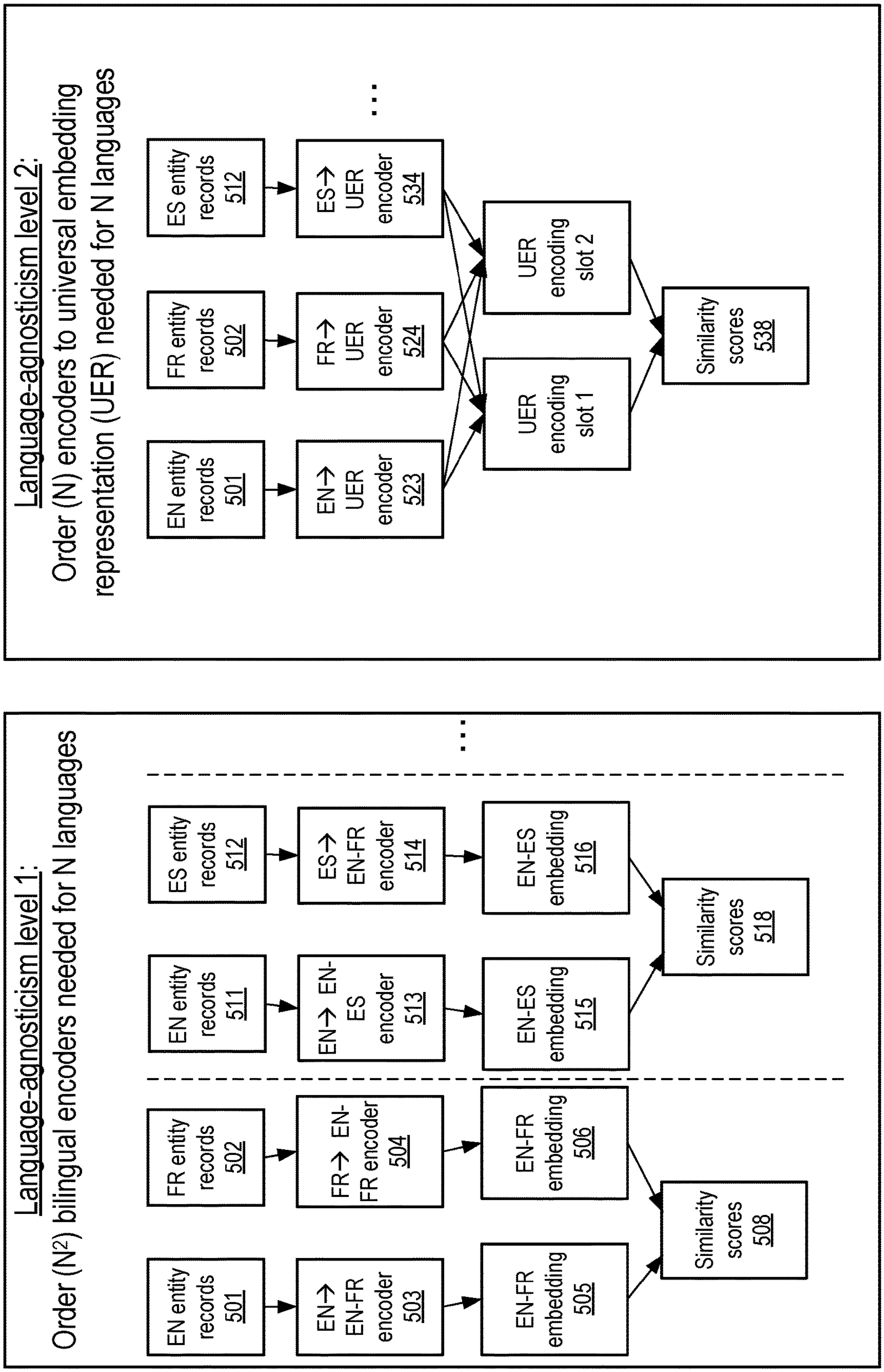
FIG. 5 and FIG. 6 collectively illustrate record encoding techniques at varying levels of language agnosticism, according to at least some embodiments.
Figure 6:
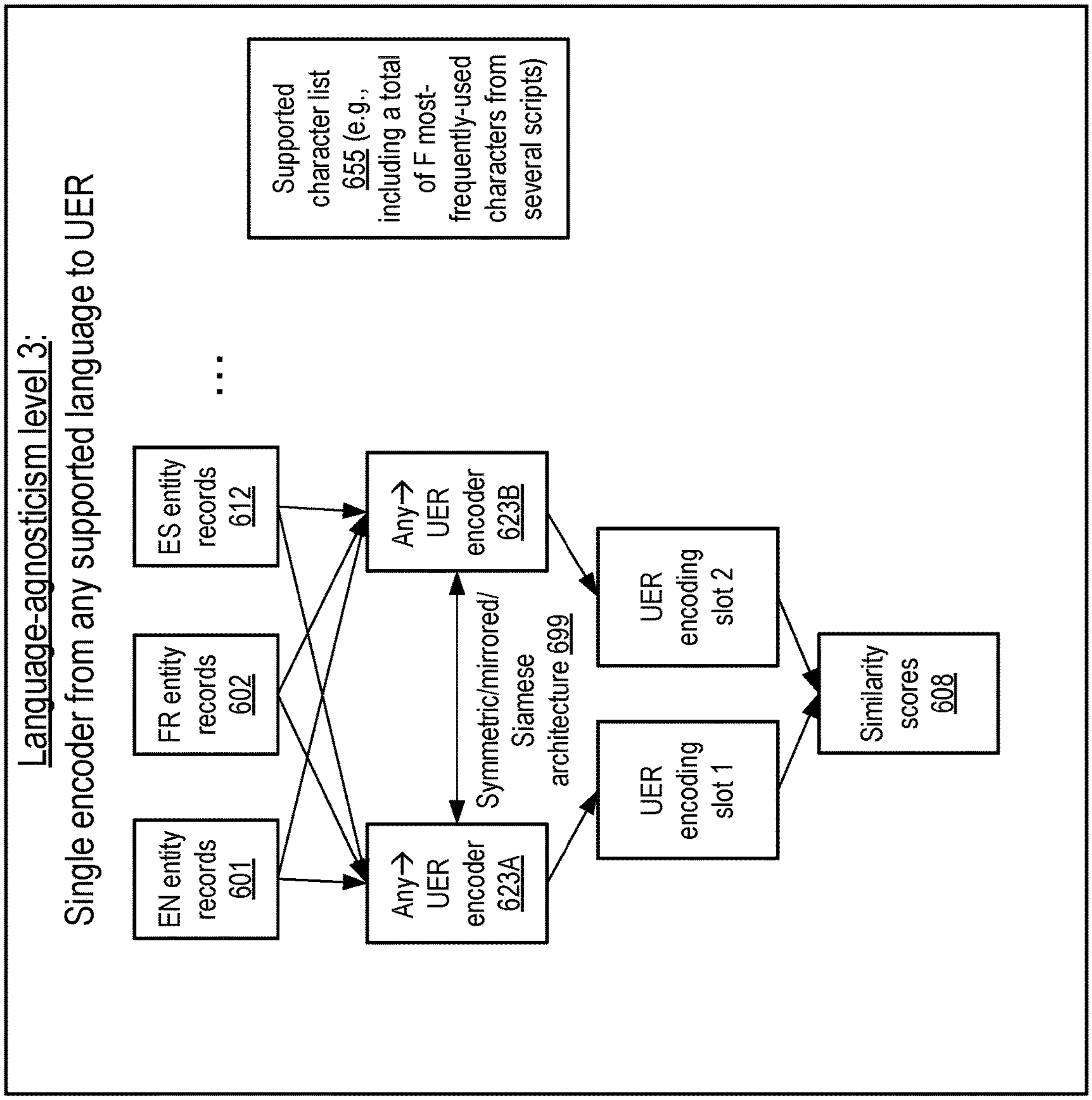

A number of different approaches may be taken with respect to analyzing entity records in a language-independent manner. FIG. 5 and FIG. 6 collectively illustrate record encoding techniques at varying levels of language agnosticism, according to at least some embodiments. The kinds of encoders or embedding models needed for three levels of language agnosticism are shown. In the approach labeled language-agnosticism level 1, shown in FIG. 5, a respective embedding language or framework (which may be referred to as an "intermediary language" or "interlingua") may be used for each pair of languages for which similarity analysis of entity records is to be performed, and then corresponding pairs of embedding models or encoders may be trained for each pair. If entity records in a total of N languages are to be analyzed, this means that $O(N^2)$ bilingual encoders have to be developed/trained in level 1.

In the depicted example, bilingual encoders for the language pairs (English (EN), French (FR)) and ((English (EN), Spanish (ES)) are shown. In the English-French context, entity records 501 in English are provided as input to a bilingual encoder 503 which represents English text in the EN-FR embedding space, providing EN-FR embeddings 505 as output. Entity records 502 in French are provided as input to another bilingual encoder 504 which transforms French text into the common EN-FR embedding space, providing EN-FR embeddings 506 as output. Embeddings 505 and 506, which are in the common EN-FR interlingua, can then be analyzed for similarity, resulting in similarity scores 508. Similarly, in the English-Spanish contest, entity records 511 in English are provided as input to a bilingual encoder 513 which represents English text in an EN-ES embedding space, providing EN-ES embeddings 515 as output. Entity records 512 in Spanish are provided as input to another bilingual encoder 514 which transforms Spanish text into the common EN-ES embedding space, providing EN-ES embeddings 516 as output. Embeddings 515 and 516, which are in the common EN-ES interlingua, can then be analyzed for similarity, resulting in similarity scores 518. Similar techniques may be implemented for each pair of languages of interest. As the number of languages to be supported increases, the task of training and evaluating the total number of encoders required may become impracticable in level 1 language-agnosticism.

In level 2 language-agnosticism, also shown in FIG. 5, a universal embedding representation (UER) or universal interlingua may be used instead of a set of pairwise interlinguas. In this approach, for the N languages to be supported, N encoders (one from each of the languages to the UER) may have to be trained, instead of the $(O(N^2))$ bilingual encoders needed for agnosticism level 1. Thus, entity records 501, 502, and 512 in English, French and Spanish respectively may be provided as inputs to an EN-to-UER encoder 523, an FR-EUR encoder 524 and an ES-USER encoder 534. The outputs produced by each of the encoders is in UER; any desired pair of UER encodings (shown as occupying slots 1 and 2) may be used as input to a similarity analysis model, resulting in similarity scores 538. However, even in the level 2 approach, more and more encoders have to be developed and tested as the number of languages increases.

Language-agnosticism level 3, shown in FIG. 6, improves upon both level 1 and level 2 in terms of the number of encoders that have to be trained. A UER is used in the level 3 approach, just as a UER is used in the level 2 approach. However, a single hierarchical encoder (discussed in further detail below), which starts with character-level encoding and also employs nested encoders at the token, attribute and entity record level, is used to capture the salient aspects of entity records regardless of their language, and represent them in the UER. A symmetric/mirrored or Siamese architecture 699 may be implemented in at least some embodiments, with a pair of mirrored neural networks sharing parameters. Entity records in any of the N languages, such as English records 601, French records 602 and Spanish records 612, can all be provided as input to the mirrored Any-language-to-UER encoders 623A and 623B. The UER encodings (slot 1 and slot 2) may be used to generate fully similarity scores 608 in various embodiments.

In at least some embodiments, a supported character list 655 may be generated and used for managing the input of the Any-language-to-UER encoders. A corpus of entity records in the various languages of interest, or some other domain-relevant corpus in the various languages of interest, may be analyzed to determine the frequency of occurrence of each of the characters (across different languages, with different scripts in some cases) within the corpus. Then, the F most frequently-occurring characters, regardless of the language/script, may be selected as members of the supported character list. Before providing the entity records 601, 602, 612 etc. to the encoders 623, any characters in the entity records which do not belong to the supported character list 655 may be replaced by a special "out-of-vocabulary" symbol. For example, supported character lists containing 100 or 200 characters may be used in some embodiments. In at least some embodiments, the length of the supported character list 655 may be implemented as a tunable hyper-parameter. Clients on whose behalf the analysis of the entity records is to be performed may provide the desired length of the supported character list, or the list itself, to an analytics service via programmatic interfaces. In one embodiment, a client may specify the corpus of text (in various languages) to be used to generate the list, and the analytics service may analyze the corpus to generate the list 655.

Hierarchical Embedding Model

Figure 7:
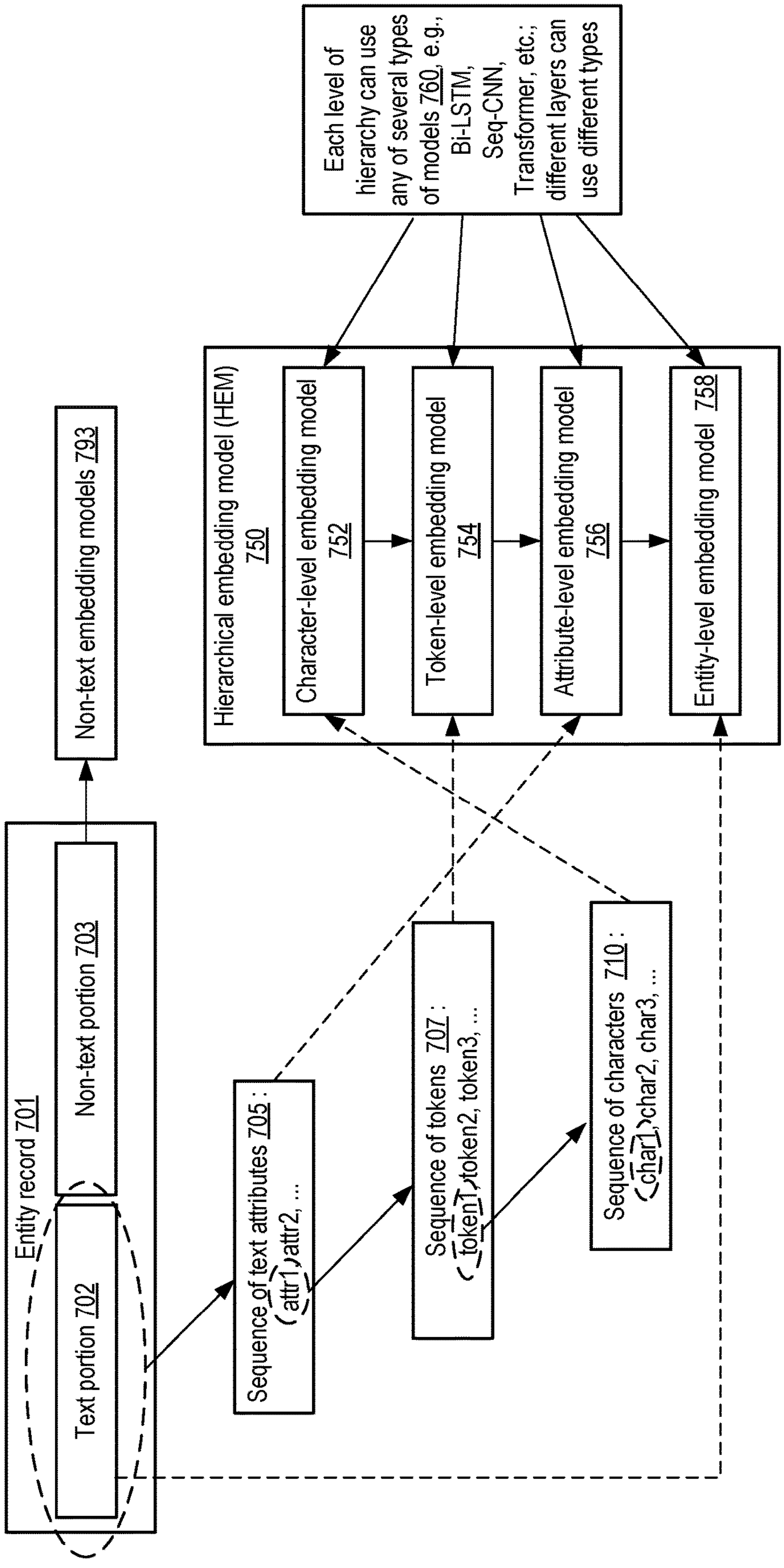
FIG. 7 illustrates an example architecture of a hierarchical embedding model which may be used to generate language-agnostic embeddings of text portions of entity records, according to at least some embodiments.

FIG. 7 illustrates an example architecture of a hierarchical embedding model which may be used to generate language-agnostic embeddings of text portions of entity records, according to at least some embodiments. A given entity record 701 for which an embedding is to be generated may comprise a text portion 702 and a non-text portion 703 in the depicted embodiment. The text portion may comprise values of one or more text attributes, such as entity name, description, color, size, and so on. The non-text portion 703, which may be optional in some embodiments, may comprise one or more images, videos, audio clips, and the like. To generate a comprehensive embedding representation of the entity record, the text portion 702 may be processed using a different model or set of models than the non-text portion 703 in some embodiments, and the results of the processing of the two portions may be combined. One or more non-text embedding models 793 may be utilized to generate the embedding for the non-text portion, while a hierarchical embedding model (HEM) 750 may be used for the text-portion in various embodiments.

Regardless of the language used, the text portion 702 may be considered as a sequence of text attributes 705, such as attr1, attr2, attr3, . . . , etc. Individual attributes such as attr1 may in turn be considered as a sequence of tokens 707 (e.g., words such as "computer", "phone", etc., numbers such as "101", "100.5" etc., or alphanumeric tokens such as "X10", etc.). The boundaries of the tokens may be determined, for example, using white space and/or a set of separator symbols such as punctuation marks. In at least some embodiments, each attribute may have an attribute name, (e.g., "description", "size" etc.) which may be prepended as a token to the sequence of tokens. Each token, such as token1, may in turn comprise a sequence of characters 710 (e.g., Unicode characters), such as char1, char2, char3, . . . . As mentioned earlier, a supported character list may be identified to simplify the embedding task in some embodiments, e.g., based on frequency of occurrence of the characters in a selected multi-language corpus, and characters which are not part of the list may be removed or replaced by a special out-of-character symbol.

The HEM 750 may comprise a group of nested models in the depicted embodiment: a character-level embedding model 752, a token-level embedding model 754, an attribute-level embedding model 756, and an entity-level embedding model 758. Output generated for all of the characters of a given token, produced by character-level embedding model 752, may in effect be combined and used as input to the token-level embedding model 754. Similarly, output generated for all of the tokens of a given attribute, produced by token-level embedding model 754, may be combined and used as input to the attribute-level embedding model 756. In addition, output generated for all of the attributes of a given entity record, produced by attribute-level embedding model 756, may be combined and used as input to the entity-level embedding model 758. Each level of the hierarchy (character→token→attribute→entity) may use any of several types of models 760 in the depicted embodiment. In implementations in which neural network based models are used, for example, some combination of bi-directional LSTM (BiLSTM) models, sequence convolutional neural networks (Seq-CNNs), and/or transformer models may be used. Different types of models may be used together in some implementations—e.g., BiLSTMs may be used for some layer or layers of the hierarchy, Seq-CNNs may be used for others, and so on. It is noted that the types of hierarchical embedding techniques introduced herein may be easily extended to cover languages which have a different hierarchy of language elements—e.g., to languages which use pictographs or logograms rather than words constructed by combining characters from an small alphabet.

Figure 8:
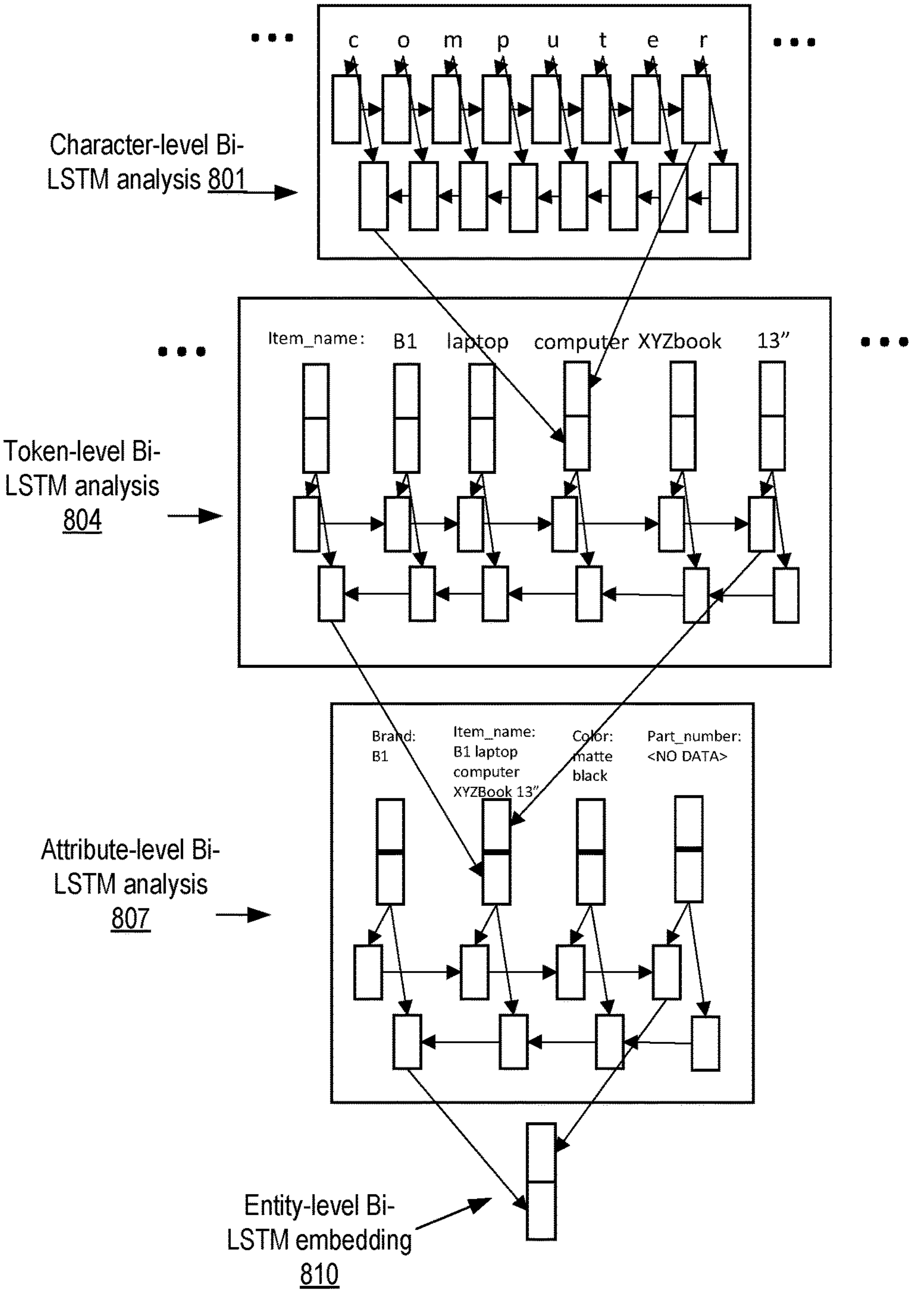
FIG. 8 illustrates an example hierarchical embedding model in which bi-directional long short-term memory units (BiLSTMs) may be used, according to at least some embodiments.

FIG. 8 illustrates an example hierarchical embedding model in which bi-directional long-short-term memory units (BiLSTMs) may be used, according to at least some embodiments. In the depicted example scenario, entity records includes attributes such as Brand, Item_name, Color, and Part_number. The Item_name attribute of a particular entity record includes the sequence of tokens "B1 laptop computer XYZbook 13". As part of the embedding procedure, each character of each token may be passed through a character-level BiLSTM embedding model, as indicated in the character-level BiLSTM analysis block 801 shown for the token "computer". In token-level BiLSTM analysis 804, respective vector or tensor embeddings created for each token of each attribute from the character-level analysis may then be used to generate attribute-level representations. In the depicted example, the names of the attributes are prepended to the attribute's token sequence, e.g., the string "Item_name:" is inserted at the start of the Item-name token sequence. Results of the attribute-level BiLSTM analysis 807 may be used to generate the Entity-Level BiLSTM embedding 810.

In at least some embodiments, the analytics service and/or tool used for the creation of the embeddings may implement programmatic interfaces enabling clients to view or inspect the embeddings generated at various levels of the hierarchy. In one embodiment, clients may be provided programmatic interfaces enabling them to manually overwrite selected text if desired. For example, a client may insert missing or incorrect values into the entity attributes (such as a value for a missing or erroneous part number in the Part_number attribute). In at least some embodiments, clients may be provided interfaces to introduce (rather than remove) errors, e.g., to help make the model more robust to unexpected/incorrect entries in the entity records. In one such embodiment, for example, a client may use such an interface to replace randomly-selected characters in a selected percentage (e.g., 0.01%) of the text with other randomly-selected characters from the supported character list.

End-to-End Model

Figure 9:
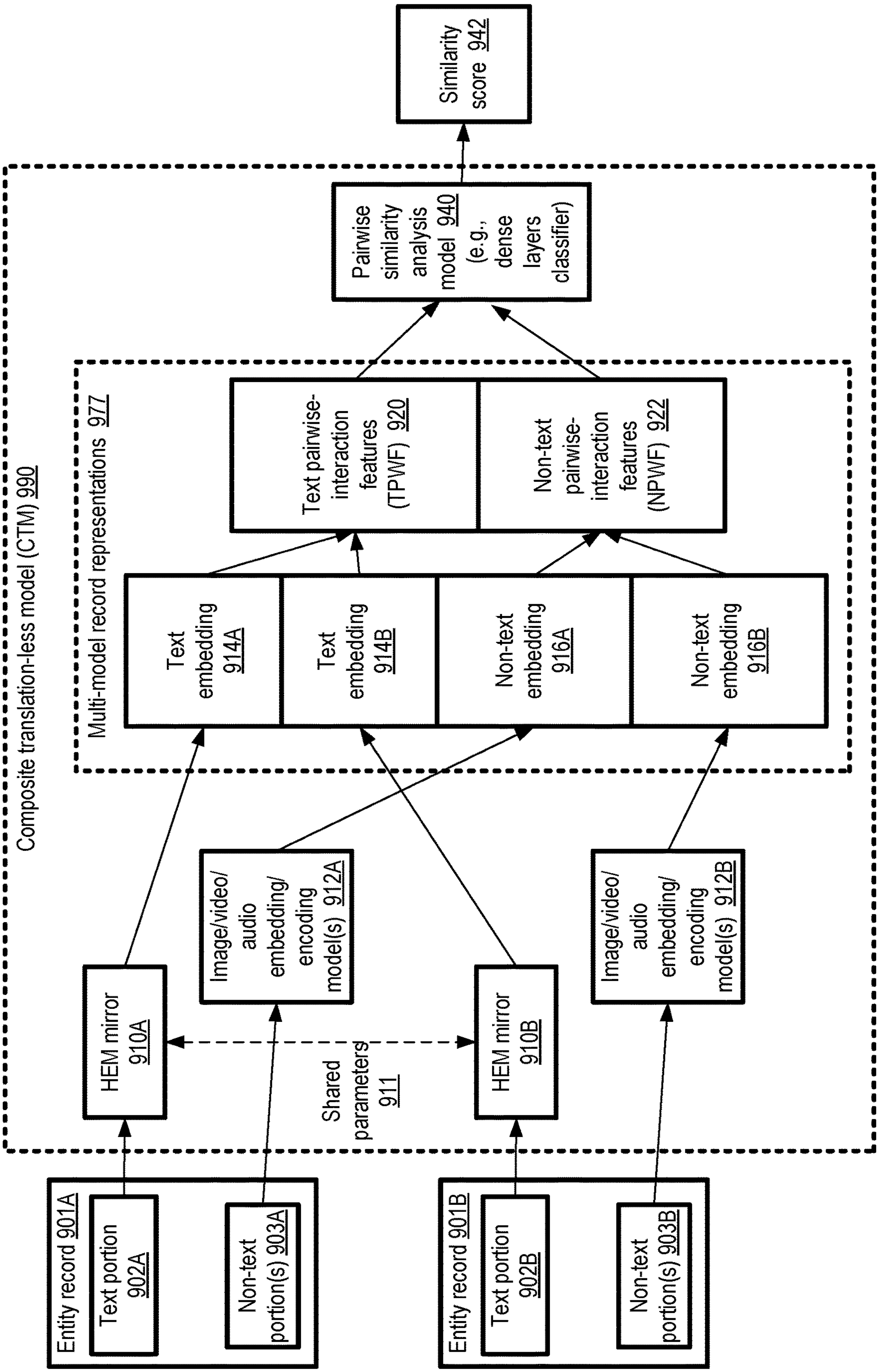
FIG. 9 illustrates aspects of an end-to-end model used to predict similarity scores for entity records expressed in different languages, according to at least some embodiments.

FIG. 9 illustrates aspects of an end-to-end model used to predict similarity scores for entity records expressed in different languages, according to at least some embodiments. In the end-to-end or composite translation-less model 990, respective HEM (hierarchical embedding model) mirrors 910A and 910B with shared parameters 911 may be used to process the text portions 902A and 902B of a given pair of entity records 901A and 901B (whose text may be expressed in any language of a set of supported languages), producing text embeddings 914A and 914B. Non-text portions 903A and 903B of the entity records may be processed, e.g., using image/video/audio embedding/encoding models 912A and 912B, producing non-text-embeddings 916A and 916B.

The pairs of text embeddings 914 and the non-text embeddings 916 (each of which may comprise, for example, a p-dimensional vector of real number values) may be combined in a variety of ways in different embodiments to generate multi-model record representations 977 of the pair of entity records 901. In the embodiment depicted in FIG. 9, for example, a set of pairwise interaction features (PWFs) may be computed. In one implementation, for two real-valued embedding vectors $X_1$ and $x_2$ of dimension p, a real-valued PWF vector of dimension 3p may be computed in some implementations as follows: pwf($x_1$, x2)=concat ($|x_1-x_2|$, $(0.5*(x_1+x_2)$, $x_1*x_2$) where "concat" represents the concatenation operation. As such, a concatenation of element-wise absolute values of differences in the input vectors' elements, arithmetic means of the elements, and products of the elements may be used to combine the contents of the embedding vectors. The benefits of using such PWFs may include, for example, eliminating any potential biases which may otherwise be introduced as a result of the order in which the two embeddings of the pairs of embeddings are combined (e.g., whether the text embeddings TE1 and TE2 of entity records ER1 and ER2 are combined with TE1 being concatenated with TE2 or with TE2 being concatenated with TE1). Other types of PWFs may be used in some embodiments. PWFs may not be used in one embodiment; instead, a concatenation of the embeddings 914 and 916 may be provided as input to the pairwise similarity analysis model 940.

A text PWF (TPWF) 920 may be derived from the text embeddings 914A and 914B, while a non-text PWF (NPWF) 922 may be derived from the non-text embeddings. The TPWF and the NPWF may be provided to a pairwise similarity analysis model 940, e.g., a neural network-based classifier comprising some number of densely-connected layers. A similarity score 942 for the entity records 901A and 901B may be produced as the output of the similarity analysis model 940 in the depicted embodiment. PWFs may not be used in one embodiment; instead, a concatenation of the embeddings 914 and 916 may be provided as input to the pairwise similarity analysis model 940.

Note that non-text attribute embeddings 916 may not be required in at least some embodiments to obtain high quality similarity scores from the CTM 990. Some entity record pairs may not have non-text attributes in one or both of the entity records of the pair, or may have duplicate images despite representing different real-world entities (for example, in a shoe catalog, a shoe of size ten may be represented by the same image attribute as a shoe of size nine, even though the two entities differ). In some embodiments, in cases where an entity record does not natively contain a non-text attribute, a missing value imputation may be performed, and a neutral non-text-attribute (such as a gray box in the case of an image) may be added as a non-text attribute to ensure that the entity record can be processed in a similar way to entity records that do contain a non-text attribute. All four of the following scenarios may be easily supported for the entity record pairs in the procedure used for preparing CTM 990 in various embodiments: (a) only one of the entity records of an entity record pair has one or more missing non-text attributes, (b) both of the entity records of an entity record pair have one or more missing non-text attributes, (c) both of the entity records of an entity record pair have duplicated non-text attributes and (d) both of the entity records have non-duplicated non-text attributes.

In some embodiments, the CTM 990 shown in FIG. 9 may be trained against binary cross-entropy loss. The training may optimize for all the parameters in the HEMs as well as the pairwise similarity analysis model 940. In some embodiments, the previously-trained versions of the image/video/audio models 912 may be obtained, e.g., based on input provided by clients of an analytics service similar to service 102 of FIG. 1. In other embodiments, the non-text embedding/encoding models 912 may also be jointly trained along with the HEM mirrors and the pairwise similarity analysis model 940. In at least one embodiment, the HEMs may be trained separately from the pairwise similarity analysis model 940.

Example Programmatic Interactions

Figure 10:
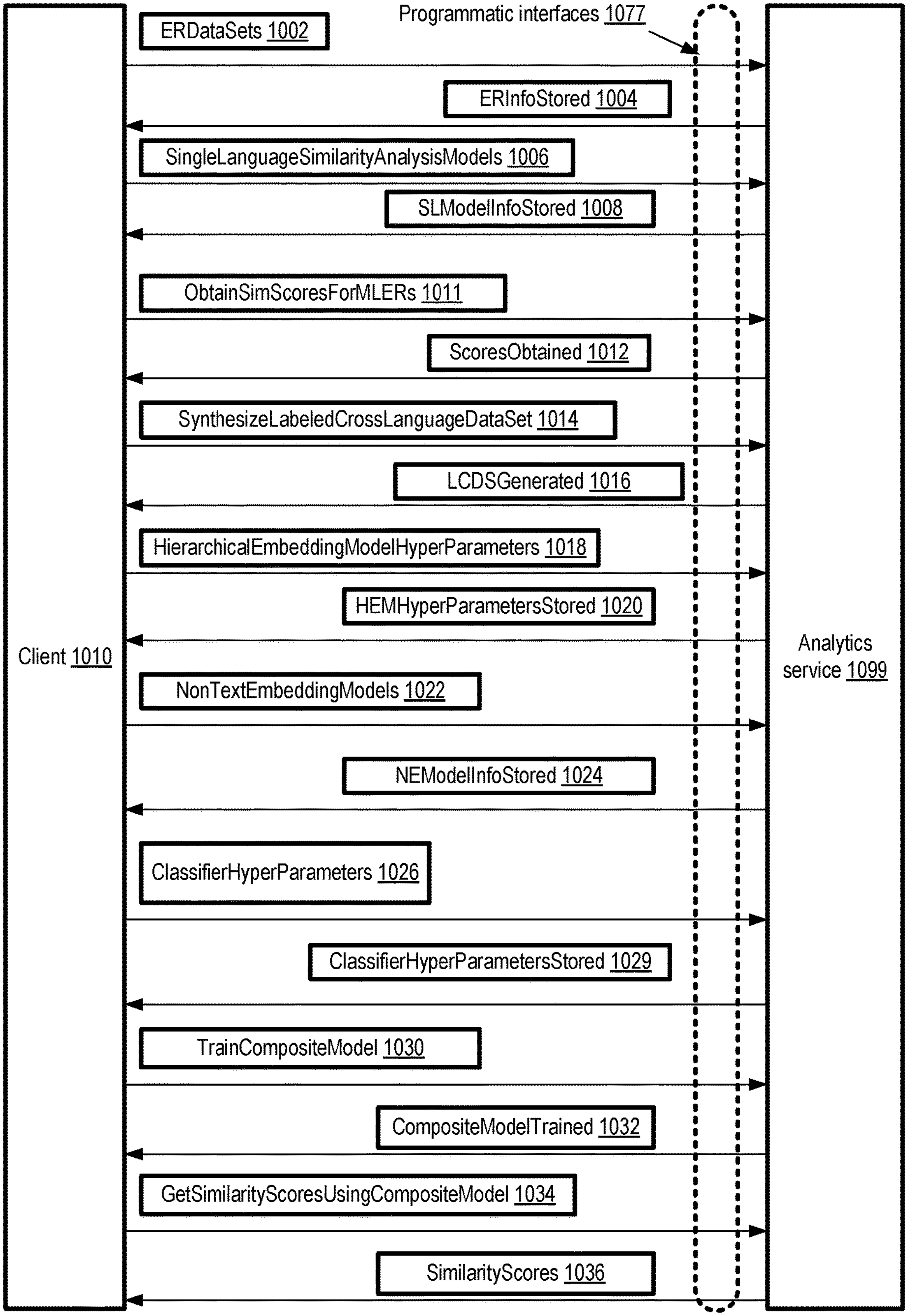
FIG. 10 illustrates example programmatic interactions pertaining to translation-less similarity analysis of entity records, according to at least some embodiments.

FIG. 10 illustrates example programmatic interactions pertaining to translation-less similarity analysis of entity records, according to at least some embodiments. Analytics service 1099, similar in features and functionality to analytics service 102 of FIG. 1, may implement one or more programmatic interfaces 1077 in the depicted embodiment, such as one or more web-based consoles, command-line tools, APIs, graphical user interfaces and the like. Using the interfaces 1077, a client 1010 of the analytics service may submit information about one or more collections of entity records via an ERDataSets message 1002. The message may, for example, indicate one or more data stores or repositories from which various entity records, including at least some multi-language entity records (MLERs) of the kind discussed earlier, can be accessed by the analytics service 1099. In some cases an ERDataSets message 1002 may include at least some of the entity records. The provided information may be stored at an analytics service repository, and an ERInfoStored message 1004 may be sent to the client in at least some embodiments. In some embodiments, the ERDataSets messages 1002 may indicate a set of languages for which cross-language entity record pair similarity analysis is to be performed on behalf of the client, and provide access to at least some entity records comprising text versions of attributes in the languages to be supported.

A client 1010 may send a SingleLanguageSimilarityAnalysisModels message 1006 to the analytics service 1099 in some embodiments, indicating one or more trained single language models which can potentially be used to obtain scores for multi-language entity record pairs. In response, the analytics service 1099 may store the information about the models, and send an SLModelInfoStored message 1008 back to the client 1010. In some embodiments, the single-language model may be included in the message 1006; in other embodiments, the client may inform the analytics service about a source from which the single language models can be obtained. In some embodiments, instead of providing a pre-trained model, a client may request the analytics service to train single-language similarity analysis models in one or more languages of interest, and provide access to training data which can be used to train such models.

In at least one embodiment, a client 1010 may submit an ObtainSimScoresForMLERs request 1011 to the analytics service, requesting that similarity indicators for some number of multi-language entity record pairs be generated or obtained. In response, in some embodiments, the analytics service 1099 may use one or more single language similarity analysis models to generate the similarity indicators. In other embodiments, a set of labels which have already been generated by human annotators for pairs of the MLERs (e.g., based on examining the attribute versions in the languages in which the annotators are fluent) may be obtained, or one or more additional labels/similarity indicators may be obtained from human annotators. In one embodiment, a combination of human annotator-generated similarity indicators and single language model-generated similarity indicators may be obtained. After the similarity indicators have been obtained, a ScoresObtained message 1012 may be sent to the client in some embodiments from the analytics service.

A SynthesizeLabeledCrossLanguageDataSet request 1014 may be sent by a client 1010 in the depicted embodiment, requesting the analytics service 1099 to generate a labeled cross language data set using a set of similarity indicators for some number of MLERs. In some embodiments, the client may also indicate that some fraction of the text on the cross-language data set should be perturbed (e.g., by replacing a specified percentage of characters in the original text by some randomly-selected other characters of a supported character list, by removing/adding randomly-selected characters, and so on). Such perturbations may help to make the composite model more robust with respect to spelling errors, missing or misplaced tokens, and so on in the input data. In one embodiment, the client may also indicate the set of languages for which the labeled cross-language data set is to be generated, and this may be used by the analytics service to select a subset of the available labeled MLERs. After the labeled cross-language data set has been generated, e.g., using techniques similar to those discussed in the context of FIG. 4, an LCDSGenerated message 1016 may be sent to the client 1010 in some embodiments.

Some clients may wish to specify one or more hyper-parameters (e.g., the types of neural networks used for various layers of the HEM, the dimensionality of the output vectors/tensors to be generated as embeddings, the number, type and sizes of layers of artificial neurons to be included at various layers of the HEM or the classifier model, the loss function to be optimized in the classifier, etc.) to be used for various subcomponents of the composite mode to be used for similarity analysis on the clients' behalf A HierarchicalEmbeddingModelHyperParameters message 1018 may be used to indicate preferred hyper-parameter values for the HEM in the depicted embodiment, while a ClassifierHyper- Parameters message 1026 may be used to provide values of hyper-parameters of the classifier subcomponent. In response, the preferred hyper-parameter values may be saved at the analytics service 1099 and response messages such as HEMHyperParametersStored 1020 or ClassifierHyperParametersStored 1029 may be sent to the client. In other embodiments, hyper-parameters for the non-text embedding/encoding models, and/or details of the pairwise interaction features to be used to combine the text and/or non-text embedding pairs may also or instead be indicated by clients to the analytics service 1099 via programmatic interfaces 1077.

A client 1010 may indicate one or more non-text embedding models to be used in the composite model via a NonTextEmbeddingModels message 1022 in some embodiments. The client may, for example, provide trained versions of the non-text embedding/encoding models, or provide pointers to sources from which trained versions of the non-text models can be obtained. In one embodiment, instead of providing access to trained versions of the non-text models, the client 1010 may request that one or more of the non-text models be trained at the analytics service, e.g., as part of the composite model training or separately from the training of the composite model. The analytics service may save the information provided about the non-text model (s) and send the client an NEModelInfoStored response message 1024 in some embodiments.

In various embodiments, a client may send a training request for the composite model as a whole, e.g., in the form of a TrainCompositeModel request 1030. In response, training of the kind of end-to-end model shown in FIG. 10 may be initiated using resources of the analytics service 1099. When the training is complete, a CompositeModelTrained message 1032 may be sent to the client from the analytics service. In at least some embodiments, the TrainCompositeModel request may be the only request that a client needs to send to the analytics service, indicating some set of data sources and to-be-supported languages; all the lower-level operations (such as generating the CLDS, selecting various hyper-parameters) may then be performed by the analytics service 1099 without requiring further guidance or interaction from the client.

After the composite model is trained, it may be stored in a repository of the analytics service in various embodiments. As and when a client wishes to obtain similarity scores for a given pair of entity records (or for a large collection of such pairs) in a language-agnostic manner, the client may submit programmatic requests for executing the trained version. For example, a GetSimilarityScoresUsingCompositeModel request 1034 may be sent by the client in some embodiments, specifying one or more pairs of entity records. The scores obtained for the specified pairs may be obtained using the trained version of the composite model, and provided to the client (and/or to one or more destinations such as downstream programs implementing various kinds of de-duplication responses), e.g., via one or more SimilarityScores messages 1036. In at least some embodiments, programmatic interactions other than those shown in FIG. 7 may be supported by an analytics service which performs transfer learning based intra-cluster analysis.

Example Provider Network Environment

Figure 11:
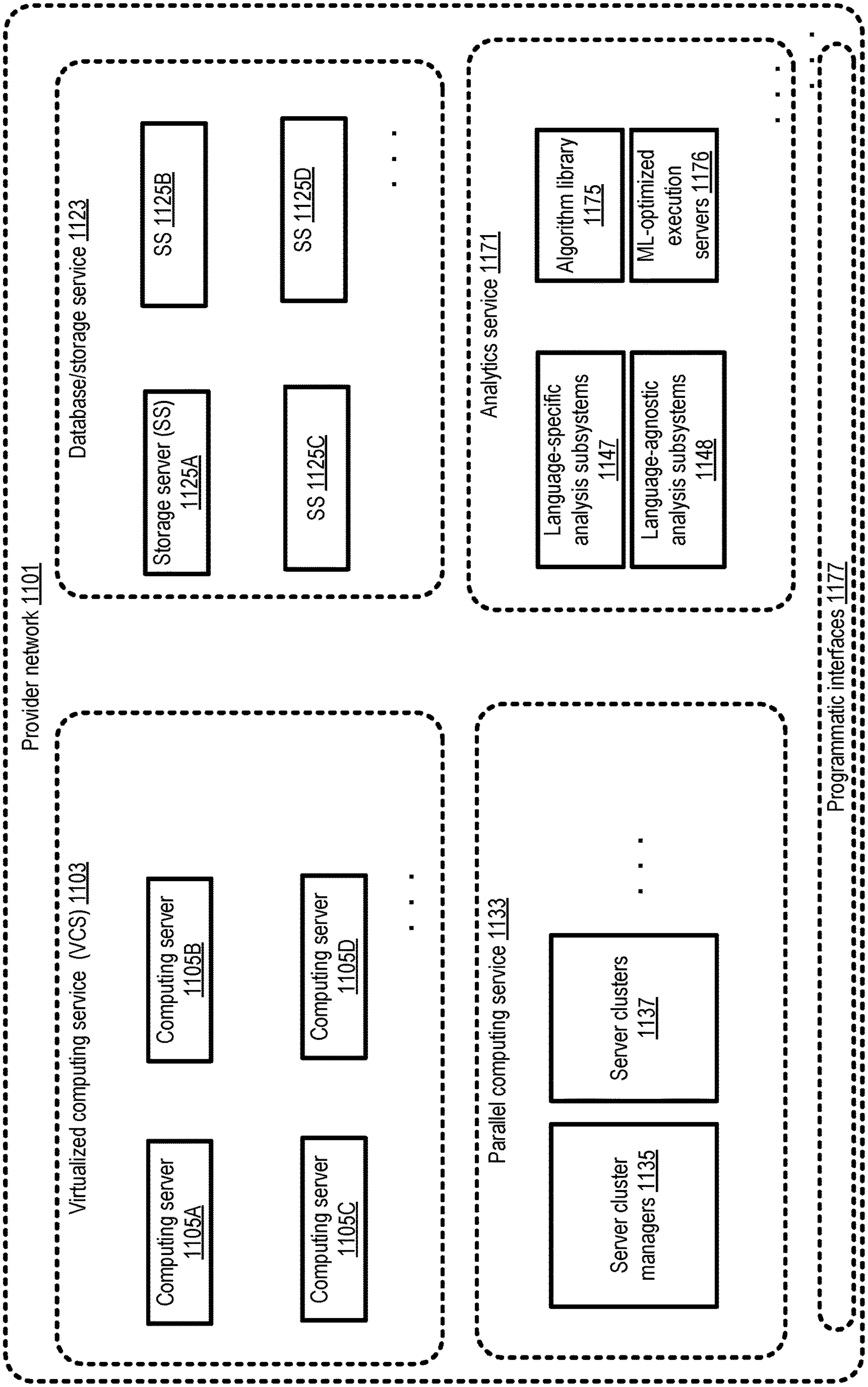
FIG. 11 illustrates an example provider network environment in which an analytics service may be implemented, according to at least some embodiments.

In some embodiments, as mentioned earlier, an analytics service at which a CTM may be implemented at a provider network. FIG. 11 illustrates an example provider network environment in which an analytics service may be implemented, according to at least some embodiments. In the depicted embodiment, provider network 1101 may comprise resources used to implement a plurality of services, including for example a virtualized computing service (VCS) 1103, a database/storage service 1123, and a parallel computing service 1133 as well as an analytics service 1171 similar in features and capabilities to analytics service 102 of FIG. 1. The analytics service 1171 in turn may comprise a language-agnostic analysis subsystem 1148 and one or more language-specific subsystem 1147 responsible for generating per-language similarity scores for entity records. Machine learning models of an algorithm library 1175, implemented at a set of machine-learning-optimized execution servers 1176, may be employed for various tasks at subsystems 1147 and 1149. The parallel computing service 1133 may comprise various server clusters 1137, each comprising a plurality of servers, on which parallelizable workloads may be distributed by a set of server cluster managers 1135 in the depicted embodiment. Some of the algorithms implemented at the analytics service may be parallelizable, and may utilize the server clusters 1137 in at least some embodiments.

Components of a given service may utilize components of other services in the depicted embodiment—e.g., for some analytics service tasks, virtual machines implemented at computing servers such as 1105A-1105D of the virtualized computing service 1103 may be used, server clusters 1137 and/or cluster managers 1135 may be utilized for parallelizable computations of the analytics service, input data and/or output produced at the analytics service may be stored at storage servers 1125 (e.g., 1125A-1125D) of storage service 1123, and so on. Individual ones of the services shown in FIG. 11 may implement a respective set of programmatic interfaces 1177 which can be used by external and/or internal clients (where the internal clients may comprise components of other services) in the depicted embodiment.

In some embodiments, at least some aspects of the language-agnostic similarity analysis techniques described herein may be implemented without acquiring resources of network-accessible services such as those shown in FIG. 11. For example, a standalone tool implemented at one or more computing devices which are not part of a network-accessible service may be used in one embodiment.

Methods for Language-Agnostic Similarity Analysis

Figure 12:
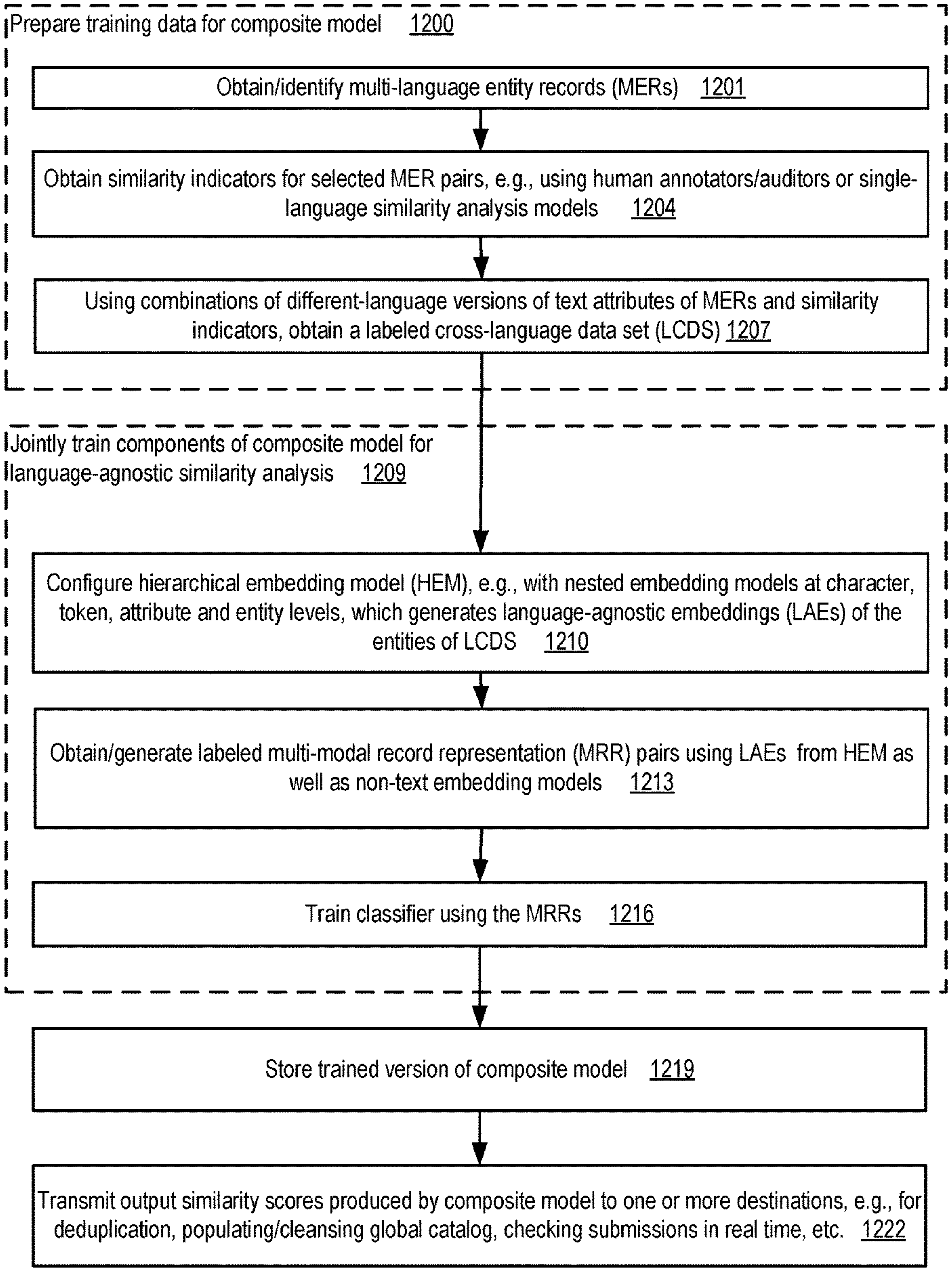
FIG. 12 is a flow diagram illustrating aspects of operations that may be performed to perform language-agnostic similarity analysis of entity records, and an example of such a data set, according to at least some embodiments.

FIG. 12 is a flow diagram illustrating aspects of operations that may be performed to perform language-agnostic similarity analysis of entity records, and an example of such a data set, according to at least some embodiments. A number of different sub-tasks may be implemented to prepare training data for a composite translation-free model (CTM) similar to CTM 133 of FIG. 1 in the depicted embodiment as indicated in element 1200, e.g., in response to one or more programmatic requests received at an analytics service. A collection of multi-language entity records (MERs) may be obtained or identified (element 1201), e.g., from entity records created by various submitters over some period of time in bilingual or multilingual countries, or created by the submitters based on the requirements of the organization at which the entity records ate stored and used. Individual ones of the MERs may comprise a respective plurality of versions of one or more text attributes, expressed in respective languages. In at least some embodiments, one or more non-text attributes (such as images) may also be present in at least some of the MERs.

Similarity indicators (e.g., numeric values over a given range, or categorical labels such as STRONG-MATCH, WEAK-MATCH, WEAK-NO-MATCH or STRONG-NO-MATCH) may be obtained for selected pairs of the MERs in some embodiments (element 1204). In one embodiment, the similarity indicators may be obtained using human annotators/auditors, while in other embodiments, at least some of the similarity indicators may be obtained using single-language similarity analysis machine learning models. A combination of single-language models and human labelers may be used in one embodiment. Translation or cross-language analysis/fluency may not be required to obtain the similarity indicators in at least some embodiments, as the text attribute values may be available in the same language for both entity records of the pairs. In at least one embodiment, a pre-existing collection of labeled/annotated MER pairs with respective similarity scores may be available, in which case the step of selecting MER pairs for annotation may not be required. In some embodiments, the MER pairs may be generated from individual MERs using techniques that tend to identify strong candidates for similarity/duplicates, strong candidates for dissimilarity/non-duplicates, as well as at least some borderline cases in which there may be relatively subtle differences between the MERs of the pair.

Using combinations of different-language versions of text attributes of the collection of MERS for which similarity indicators have been obtained, a labeled cross-language data set (LCDS) may be generated or synthesized in the depicted embodiment (element 1207). The LCDS may include an individual cross-language pair comprising, for example, (a) a first entity record with a first language version of one or more text attributes, (b) a second entity record with a second language version of the one or more text attributes and (c) a label based at least in part on a similarity indicator obtained for the MERs. The LCDS may serve as the training data for the composite model in the depicted embodiment.

A composite model for language-agnostic similarity analysis, referred to as the CTM, may comprise several sub-components or sub-models which are trained jointly in some embodiments (element 1209). One of the sub-components may comprise a hierarchical embedding model (HEM) as indicated in element 1210, with nested embedding models at the character, token/word, attribute and entity levels. The configuration of the HEM (e.g., what kinds of models such as BiLSTMs, CNNs, transformers etc. are to be used for the different layers, etc.) may be determined in some embodiments based on input received via programmatic interfaces from clients of an analytics service. In other embodiments, decisions regarding the configuration of the HEM may be made at an analytics service, e.g., using a knowledge base, without requiring client input. The HEM may generate language-agnostic embeddings (LAEs) of input entity record text attributes, e.g., in a universal embedding representation (UER) in various embodiments.

The CTM may also include a classifier in various embodiments (e.g., comprising a multi-layer perceptron or some other type of machine learning model), for which input is generated using the HEM. A plurality of labeled multi-modal record representation (MRR) pairs may be generated from the LAEs produced by the HEM, combined with embeddings of non-text attributes of the MER pairs for whose text attributes LAEs were obtained (element 1213). One or more non-text embedding models may be used, depending on the number of non-text attributes present in the MERs. The classifier may be trained, using the MRR pairs, to generate similarity scores for pairs of entity records (whose text attributes may be in any of the supported languages represented in the LCDS) in various embodiments (element 1216).

The trained version of the CTM, including the jointly-trained HEM and classifier, may be stored in various embodiments (element 1219), e.g., at a repository of the analytics service. As and when required, respective similarity scores may be produced as output by the trained CTM and transmitted to one or more destinations (element 1222) for various types of applications. Such applications may include de-duplication of existing multi-language catalogs (e.g., by merging duplicated entries representing the same real-world entities), populating and/or cleansing a global catalog, checking catalog entry submissions in real time for possible duplications, and so on.

It is noted that in various embodiments, some of the operations shown in the flow diagrams of FIG. 5 and/or FIG. 12 may be implemented in a different order than that shown in the figure, or may be performed in parallel rather than sequentially. Additionally, some of the operations shown in FIG. 5 and or FIG. 12 may not be required in one or more implementations.

Use Cases

The techniques described above, of training a translation-free language-agnostic model to generate similarity metrics for records expressed in a variety of languages, may be useful in a variety of scenarios. For example, such techniques may be used at large-scale retailing organizations to unify language-specific product catalogs into a single global catalog in which comparisons between product records can be made using a universal embedding framework, which would help simplify numerous complex catalog management tasks. Such a model may also improve the user experience of customers and vendors of store web sites. For example, when a vendor wishes to add a new item to a catalog, using a particular language to describe the item, the model may be able to near-instantaneously detect whether the same item (or a closely matching item) is already in the catalog (even if the other item is described in a different language) and cause appropriate de-duplication actions to be initiated accordingly. End-user customers of such store web sites may get better search results, as the model enables similar items to be identified quickly regardless of the language used in the records representing the items.

Illustrative Computer System

Figure 13:
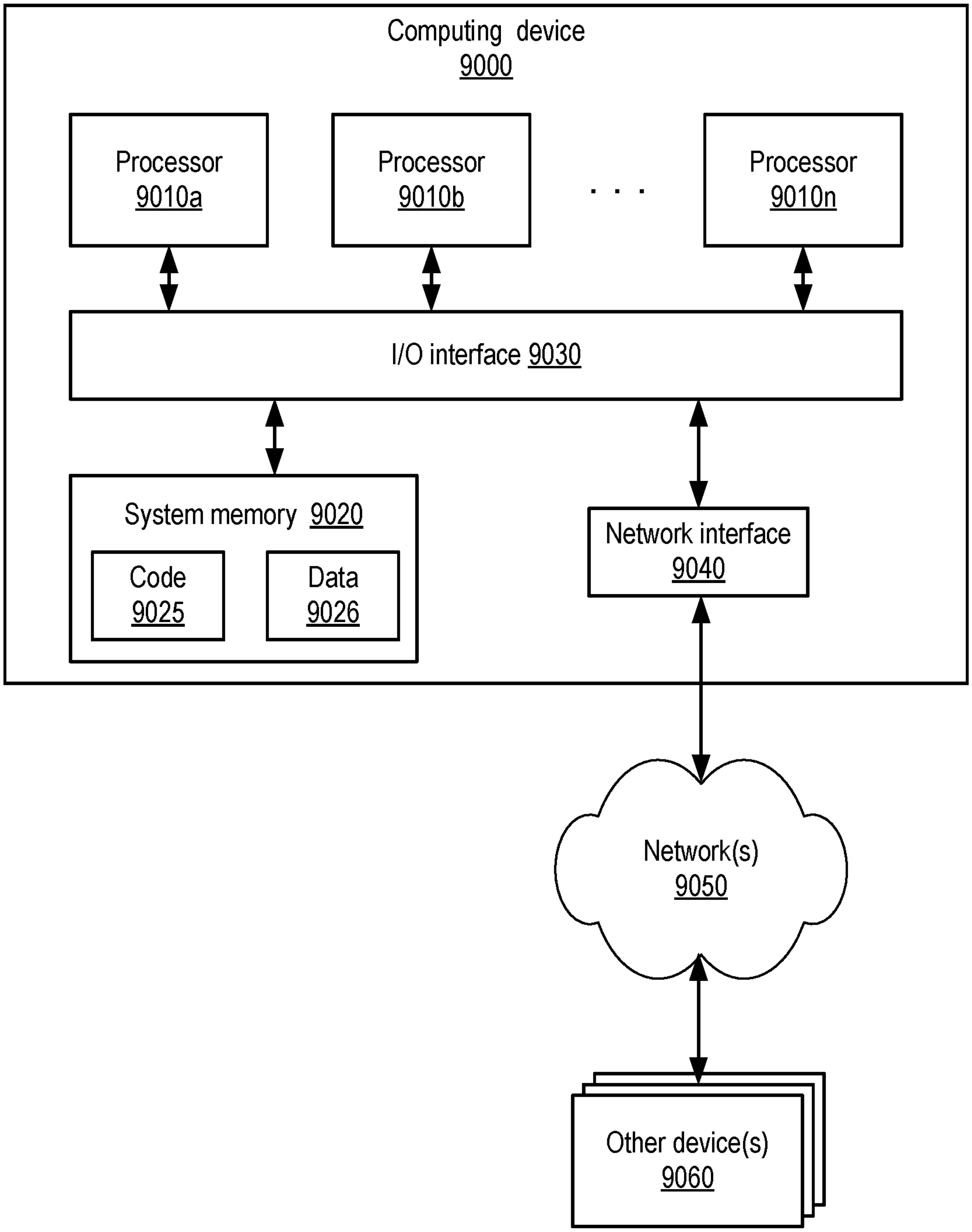
FIG. 13 is a block diagram illustrating an example computing device that may be used in at least some embodiments.

In at least some embodiments, a server that implements the types of techniques described herein (e.g., various functions of an analytics service) may include a general-purpose computer system that includes or is configured to access one or more computer-accessible media. FIG. 13 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 12, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 12. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A computer-implemented method, comprising:

obtaining, via one or more programmatic interfaces of a cloud computing environment, a request to add a first entity record to a collection of entity records, wherein the first entity record comprises one or more text attributes expressed in a first language;

generating embeddings for the first entity record at a plurality of hierarchical levels comprising an entity record level and one or more of: a character level, a token level, or an attribute level;

determining, at the cloud computing environment using embedding representations of at least some entity records of the collection, including a representation for the embeddings for the first record at the plurality of hierarchical levels, that a similarity score between the first entity record and a second entity record of the collection exceeds a threshold, wherein the second entity record comprises one or more text attributes in a second language, wherein the similarity score is determined without translating a text attribute of the first entity record, and wherein the similarity score is determined without translating a text attribute of the second entity record; and rejecting, at the cloud computing environment, based at least in part on said determining, the request to add the first entity record to the collection.

2. The computer-implemented method as recited in claim 1, further comprising:

training one or more machine learning models to generate respective similarity scores with respect to pairs of entity records, wherein the similarity score is obtained from a trained version of a particular machine learning model of the one or more machine learning models.

3. The computer-implemented method as recited in claim 1, wherein the similarity score is obtained using one or more machine learning models, the computer-implemented further comprising:

synthesizing at least a portion of a training data set of the one or more machine learning models.

4. The computer-implemented method as recited in claim 1, wherein the first entity record comprises a first non-text attribute, wherein the second entity record comprises a second non-text attribute, and wherein the similarity score is based at least in part on analysis of the first and second non-text attributes.

5. The computer-implemented method as recited in claim 1, further comprising:

obtaining, via the one or more programmatic interfaces, an indication of a non-text encoding model; and determining the similarity score based at least in part on analysis of respective non-text attributes of the first and second entity records, wherein the analysis of the respective non-text attributes is performed at least in part using the non-text encoding model.

6. The computer-implemented method as recited in claim 1, wherein the similarity score is obtained using one or more machine learning models, the computer-implemented further comprising:

obtaining, via the one or more programmatic interfaces, a value of a hyper-parameter of a particular machine learning model of the one or more machine learning models; and utilizing the value to obtain the similarity score.

7. The computer-implemented method as recited in claim 1, wherein the similarity score is obtained using one or more machine learning models, the computer-implemented further comprising:

obtaining, via a programmatic interface, an indication of a plurality of languages for which the one or more machine learning models are to be trained, including the first language and the second language; and identifying, based at least in part on the plurality of languages, a data set used to train the one or more machine learning models.

8. A system, comprising:

one or more computing devices;

wherein the one or more computing devices include instructions that upon execution on or across one or more processors cause the one or more processors to:

obtain, via one or more programmatic interfaces of a cloud computing environment, a request to add a first entity record to a collection of entity records, wherein the first entity record comprises one or more text attributes expressed in a first language;

generate embeddings for the first entity record at a plurality of hierarchical levels comprising an entity record level and one or more of: a character level, a token level, or an attribute level;

determine, at the cloud computing environment using embedding representations of at least some entity records of the collection, including a representation for the embeddings for the first record at the plurality of hierarchical levels, that a similarity score between the first entity record and a second entity record of the collection exceeds a threshold, wherein the second entity record comprises one or more text attributes in a second language, wherein the similarity score is determined without translating a text attribute of the first entity record, and wherein the similarity score is determined without translating a text attribute of the second entity record; and reject, at the cloud computing environment, based at least in part on said determining, the request to add the first entity record to the collection.

9. The system as recited in claim 8, wherein the one or more computing devices include further instructions that upon execution on or across the one or more processors cause the one or more processors to:

train one or more machine learning models to generate respective similarity scores with respect to pairs of entity records, wherein the similarity score is obtained from a trained version of a particular machine learning model of the one or more machine learning models.

10. The system as recited in claim 8, wherein the similarity score is obtained using one or more machine learning models, and wherein the one or more computing devices include further instructions that upon execution on or across the one or more processors cause the one or more processors to:

synthesize at least a portion of a training data set of the one or more machine learning models.

11. The system as recited in claim 8, wherein the first entity record comprises a first non-text attribute, wherein the second entity record comprises a second non-text attribute, and wherein the similarity score is based at least in part on analysis of the first and second non-text attributes.

12. The system as recited in claim 8, wherein the one or more computing devices include further instructions that upon execution on or across the one or more processors cause the one or more processors to:

obtain, via the one or more programmatic interfaces, an indication of a non-text encoding model; and determine the similarity score based at least in part on analysis of respective non-text attributes of the first and second entity records, wherein the analysis of the respective non-text attributes is performed at least in part using the non-text encoding model.

13. The system as recited in claim 8, wherein the similarity score is obtained using one or more machine learning models, and wherein the one or more computing devices include further instructions that upon execution on or across the one or more processors cause the one or more processors to:

obtain, via the one or more programmatic interfaces, a value of a hyper-parameter of a particular machine learning model of the one or more machine learning models; and utilize the value to obtain the similarity score.

14. The system as recited in claim 8, wherein the similarity score is obtained using one or more machine learning models, and wherein the one or more computing devices include further instructions that upon execution on or across the one or more processors cause the one or more processors to:

obtain, via a programmatic interface, an indication of a plurality of languages for which the one or more machine learning models are to be trained, including the first language and the second language; and identify, based at least in part on the plurality of languages, a data set used to train the one or more machine learning models.

15. One or more non-transitory computer-accessible storage media storing program instructions that when executed on or across one or more processors:

obtain, via one or more programmatic interfaces of a cloud computing environment, a request to add a first entity record to a collection of entity records, wherein the first entity record comprises one or more text attributes expressed in a first language;

generate embeddings for the first entity record at a plurality of hierarchical levels comprising an entity record level and one or more of: a character level, a token level, or an attribute level;

determine, at the cloud computing environment using embedding representations of at least some entity records of the collection, including a representation for the embeddings for the first record at the plurality of hierarchical levels, that a similarity score between the first entity record and a second entity record of the collection exceeds a threshold, wherein the second entity record comprises one or more text attributes in a second language, wherein the similarity score is determined without translating a text attribute of the first entity record, and wherein the similarity score is determined without translating a text attribute of the second entity record; and reject, at the cloud computing environment, based at least in part on said determining, the request to add the first entity record to the collection.

16. The one or more non-transitory computer-accessible storage media as recited in claim 15, storing further program instructions that when executed on or across the one or more processors:

train one or more machine learning models to generate respective similarity scores with respect to pairs of entity records, wherein the similarity score is obtained from a trained version of a particular machine learning model of the one or more machine learning models.

17. The one or more non-transitory computer-accessible storage media as recited in claim 15, wherein the similarity score is obtained using one or more machine learning models, and wherein the one or more non-transitory computer-accessible storage media store further program instructions that when executed on or across the one or more processors:

synthesize at least a portion of a training data set of the one or more machine learning models.

18. The one or more non-transitory computer-accessible storage media as recited in claim 15, wherein the first entity record comprises a first non-text attribute, wherein the second entity record comprises a second non-text attribute, and wherein the similarity score is based at least in part on analysis of the first and second non-text attributes.

19. The one or more non-transitory computer-accessible storage media as recited in claim 15, storing further program instructions that when executed on or across the one or more processors:

obtain, via the one or more programmatic interfaces, an indication of a non-text encoding model; and determine the similarity score based at least in part on analysis of respective non-text attributes of the first and second entity records, wherein the analysis of the respective non-text attributes is performed at least in part using the non-text encoding model.

20. The one or more non-transitory computer-accessible storage media as recited in claim 15, wherein the similarity score is obtained using one or more machine learning models, and wherein the one or more non-transitory computer-accessible storage media store further program instructions that when executed on or across the one or more processors:

obtain, via the one or more programmatic interfaces, a value of a hyper-parameter of a particular machine learning model of the one or more machine learning models; and utilize the value to obtain the similarity score.

* * * * *